US012782687B2

(12) United States Patent
Tang et al.

(10) Patent No.: US 12,782,687 B2
(45) Date of Patent: Nov. 3, 2026

(54) CAMERA OPTICAL LENS COMPRISING SEVEN LENSES

(71) Applicant: AAC Optics (Suzhou) Co., Ltd., Suzhou (CN)

(72) Inventors: Han Tang, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 368 days.

(21) Appl. No.: 18/399,780

(22) Filed: Dec. 29, 2023

(65) Prior Publication Data

US 2025/0093619 A1 Mar. 20, 2025

(30) Foreign Application Priority Data

Sep. 20, 2023 (CN) ........................ 202311218788.9

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
None
See application file for complete search history.

(56) References Cited

U.S. PATENT DOCUMENTS

2012/0212836 A1* 8/2012 Hsieh ................. G02B 13/0045 359/708
2023/0076657 A1* 3/2023 Teranishi ............... G02B 13/04
2023/0314769 A1* 10/2023 Yang .................. G02B 13/0045 359/708

FOREIGN PATENT DOCUMENTS

CN 114721125 A * 7/2022 ........... G02B 13/006

* cited by examiner

*Primary Examiner* — Paul C Lee
(74) *Attorney, Agent, or Firm* — Wiersch Law Group

(57) ABSTRACT

A camera optical lens includes from object side to image side: first lens, second lens, third lens, fourth lens, fifth lens, sixth lens and seventh lens. On-axis distance d6 from image-side surface of third lens to object-side surface of fourth lens, total optical length TTL, field of view FOV of camera optical lens, full field of view image height IH in diagonal direction of camera optical lens, focal length f of camera optical lens, focal length f3 of the third lens, central curvature radius R3 of object-side surface of second lens, and central curvature radius R4 of image-side surface of second lens satisfy following relational expressions: $0.06 \leq d6/TTL \leq 0.20$; $90.00 \leq (FOV \times f)/IH \leq 140.00$; $1.00 \leq f3/f \leq 5.00$; and $1.00 \leq R4/R3 \leq 15.00$. The camera optical lens has good optical performance such as large aperture, wide-angle and ultra-thinness.

11 Claims, 12 Drawing Sheets

CAMERA OPTICAL LENS COMPRISING SEVEN LENSES

TECHNICAL FIELD

The present disclosure relates to the field of optical lenses, in particular to a camera optical lens suitable for handheld terminal devices such as smart phones and digital cameras, laser radar devices and camera devices such as monitors and PC lenses.

BACKGROUND

In recent years, the demand for miniaturized camera lenses has been increasing. For example, under the push of an intelligent detection technology, a 3D spatial detection technology based on a laser radar is rapidly developing. The laser radar camera lens has the advantages of high detection precision, strong anti-interference capability, long coverage range, wide application range and the like, and has been applied to military and civil fields. However, the optical sensing device of the camera lens is not only a charge coupled device (CCD) or a complementary metal-oxide semiconductor sensor (CMOS sensor), and due to the precision of semiconductor manufacturing technology, the pixel size of the optical sensor is reduced, so that the miniaturized camera lens with good imaging quality becomes a mainstream in the current market. In addition, with the development of technology and the increase of diversified requirements of users, the pixel area of the optical sensor is continuously reduced and the requirements on the imaging quality of the system are improving, the structures of five-piece, six-piece and seven-piece lens gradually appear in the lens design. There is an urgent demand for a camera optical lens having good optical characteristics such as large-aperture, ultra-thinness, wide-angle.

SUMMARY

In view of the above problems, an object of the present disclosure is to provide a camera optical lens, which can meet the requirements of large-aperture, ultra-thinness and wide-angle while having high imaging performance.

In order to solve the above technical problem, an embodiment of the present disclosure provides a camera optical lens. The camera optical lens includes from an object side to an image side: a first lens, a second lens, a third lens, a fourth lens, a fifth lens, a sixth lens and a seventh lens;

wherein an on-axis distance from an image-side surface of the third lens to an object-side surface of the fourth lens is d6, a total optical length from an object-side surface of the first lens to an image plane of the camera optical lens along an optic axis of the camera optical lens is TTL, a field of view of the camera optical lens is FOV, a full field of view image height in a diagonal direction of the camera optical lens is IH, a focal length of the camera optical lens is f, a focal length of the third lens is f3, a central curvature radius of an object-side surface of the second lens is R3, and a central curvature radius of an image-side surface of the second lens is R4, and following relational expressions are satisfied:

$$0.06 \leq d6/TTL \leq 0.20;$$

$$90.00 \leq (FOV \times f)/IH \leq 140.00;$$

-continued $$1.00 \leq f3/f \leq 5.00; \text{ and}$$

$$1.00 \leq R4/R3 \leq 15.00.$$

As an improvement, a refractive index of the first lens is n1, and a following relational expression is satisfied:

$$1.70 \leq n1 \leq 2.10.$$

As an improvement, a focal length of the fourth lens is f4, a focal length of the fifth lens is f5, and a following relational expression is satisfied:

$$-4.00 \leq f4/f5 \leq -0.60.$$

As an improvement, an on-axis thickness of the second lens is d3, an on-axis thickness of the third lens is d5, and a following relational expression is satisfied:

$$1.20 \leq d3/d5 \leq 5.00.$$

As an improvement, the first lens has a negative refractive power, and an image-side surface of the first lens is concave in a paraxial region;

a focal length of the first lens is f1, a central curvature radius of an object-side surface of the first lens is R1, a central curvature radius of an image-side surface of the first lens is R2, and an on-axis thickness of the first lens is d1, and following relational expressions are satisfied:

$$-4.50 \leq f1/f \leq -1.40;$$

$$0.24 \leq (R1+R2)/(R1-R2) \leq 2.57; \text{ and}$$

$$0.30 \leq d1/TTL \leq 0.20.$$

As an improvement, the object-side surface of the second lens is concave in a paraxial region, and the image-side surface of the second lens is convex in the paraxial region;

a focal length of the second lens is f2, an on-axis thickness of the second lens is d3, and following relational expressions are satisfied:

$$-13.03 \leq f2/f \leq 18.87; \text{ and}$$

$$0.09 \leq d3/TTL \leq 0.20.$$

As an improvement, the third lens has a positive refractive power, and an object-side surface of the third lens is convex in a paraxial region;

a central curvature radius of the object-side surface of the third lens is R5, a central curvature radius of the image-side surface of the third lens is R6, and an on-axis thickness of the third lens is d5, and following relational expressions are satisfied:

$$-2.06 \leq (R5+R6)/(R5-R6) \leq -0.30; \text{ and}$$

$$0.30 \leq d5/TTL \leq 0.09.$$

As an improvement, the fourth lens has a negative refractive power, and the object-side surface of the fourth lens is concave in a paraxial region.

a focal length of the fourth lens is f4, a central curvature radius of the object-side surface of the fourth lens is R7, a central curvature radius of an image-side surface of the fourth lens is R8, an on-axis thickness of the fourth lens is d7, and following relational expressions are satisfied:

$$-6.91 \leq f4/f \leq -1.58;$$

$$-7.81 \leq (R7+R8)/(R7-R8) \leq -0.07; \text{ and}$$

$$0.01 \leq d7/TTL \leq 0.04.$$

As an improvement, the fifth lens has a positive refractive power, and an object-side surface of the fifth lens is convex in a paraxial region;

a focal length of the fifth lens is f5, a central curvature radius of the object-side surface of the fifth lens is R9, a central curvature radius of an image-side surface of the fifth lens is R10, and an on-axis thickness of the fifth lens is d9, and following relational expressions are satisfied:

$$1.70 \leq f5/f \leq 3.63;$$

$$-2.38 \leq (R9+R10)/(R9-R10) \leq -0.34; \text{ and}$$

$$0.03 \leq d9/TTL \leq 0.15.$$

As an improvement, an object-side surface of the sixth lens is convex in a paraxial region, and an image-side surface of the sixth lens is concave in the paraxial region;

a focal length of the sixth lens is f6, a central curvature radius of the object-side surface of the sixth lens is R11, a central curvature radius of the image-side surface of the sixth lens is R12, and an on-axis thickness of the sixth lens is d11, and following relational expressions are satisfied:

$$-20.00 \leq f6/f \leq 49.00;$$

$$-70.00 \leq (R11+R12)/(R11-R12) \leq 11.35; \text{ and}$$

$$0.02 \leq d11/TTL \leq 0.07.$$

As an improvement, the seventh lens has a positive refractive power, an object-side surface of the seventh lens is convex in a paraxial region, and an image-side surface of the seventh lens is concave in the paraxial region;

a focal length of the seventh lens is f7, a central curvature radius of the object-side surface of the seventh lens is R13, a central curvature radius of the image-side surface of the seventh lens is R14, and an on-axis thickness of the seventh lens is d13, and following relational expressions are satisfied:

$$4.60 \leq f7/f \leq 70.00;$$

$$-17.00 \leq (R13+R14)/(R13-R14) \leq 39.00; \text{ and}$$

$$0.04 \leq d13/TTL \leq 0.25.$$

As an improvement, at least one of the first lens, the second lens, the third lens, the fourth lens, the fifth lens, the sixth lens, or the seventh lens is made of glass.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

Embodiment 1

Figure 1:
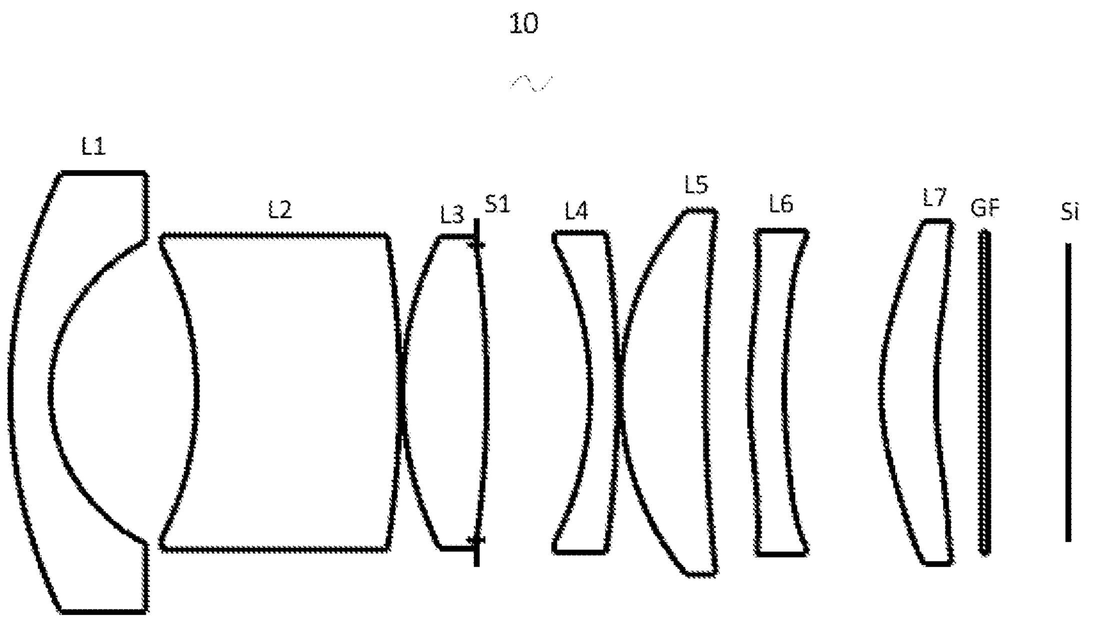
FIG. 1 is a structural schematic diagram of a camera optical lens according to Embodiment 1 of the present disclosure.

Referring to the drawings, the present disclosure provides a camera optical lens 10. FIG. 1 shows a camera optical lens 10 according to Embodiment 1 of the present disclosure, the camera optical lens 10 includes seven lenses. The camera optical lens 10 includes from an object side to an image side: a first lens L1, a second lens L2, a third lens L3, a fourth lens L4, a fifth lens L5, a sixth lens L6 and a seventh lens L7. An optical element such as an optical filter GF may be provided between a seventh lens L7 and an image surface Si.

In this embodiment, the first lens L1, the second lens L2, the third lens L3, the fourth lens L4, the fifth lens L5, the sixth lens L6, and the seventh lens L7 are all made of glass.

The first lens L1 is a spherical lens, the second lens L2 is a spherical lens, the third lens L3 is a spherical lens, the fourth lens L4 is a spherical lens, the fifth lens L5 is a spherical lens, the sixth lens L6 is an aspheric lens, and the seventh lens L7 is an aspheric lens.

In this embodiment, an on-axis distance from the image-side surface of the third lens L3 to the object-side surface of the fourth lens L4 is defined as d6, and the total optical length from the object-side surface of the first lens to an image plane of the camera optical lens 10 along an optic axis of the camera optical lens 10 is defined as TTL, and a following relational expression is satisfied: $0.06 \le d6/TTL \le 0.20$, which specifies a ratio of the on-axis distance d6 from the image-side surface of the third lens L3 to the object-side surface of the fourth lens L4 to the total optical length from the object-side surface of the first lens to an image plane of the camera optical lens 10 along an optic axis TTL of the camera optical lens 10, within a specified range, a distance between the two lenses (the third lens L3 and the fourth lens L4) at the diaphragm is large, and light near the diaphragm is in smooth transition, which is beneficial to improving image quality.

In this embodiment, a field of view of the camera optical lens 10 is defined as FOV, an image height of the camera optical lens 10 is defined as IH, a focal length of the camera optical lens 10 is defined as f, and a following relational expression is satisfied: $90.00 \le (FOV \times f)/IH \le 140.00$, which specifies a ratio of the product of the field of view FOV of the camera optical lens 10 and the focal length f of the camera optical lens 10 to the image height IH of the camera optical lens 10, and within a specified range, a large field of view and a long focal length are considered, to achieve medium-to long-range distance imaging. In an embodiment, the following relational expression is satisfied: $FOV \ge 70.00$, so that the lens meets the requirement of wide-angle.

In this embodiment, a focal length of the third lens L3 is defined as f3, a following relational expression is satisfied: $1.00 \le f3/f \le 5.00$, a ratio of the focal length f3 of the third lens L3 to the focal length f of the camera optical lens 10 is specified, the focal length value of the single lens is controlled, within a specified range, the focal lengths may be reasonably distributed, which is beneficial to controlling temperature drift and has good temperature performance.

In this embodiment, a central curvature radius of an object-side surface of the second lens L2 is defined as R3, and a central curvature radius of an image-side surface of the second lens L2 is defined as R4, a following relational expression is satisfied: $1.00 \le R4/R3 \le 15.00$, a shape of the second lens L2 is specified, within a specified range, the degree of deflection of light passing through the lens can be mitigated, which is beneficial to correcting the problems such as the aberration of the off-axis angle.

When the field of view of the camera optical lens 10, the image height of the camera optical lens 10, the total optical length from the object-side surface of the first lens to an image plane of the camera optical lens 10 along an optic axis of the camera optical lens 10, the focal length of the camera optical lens 10, the focal length of the related lens, the thickness of the related lens, the central curvature radius of the object-side surface of the related lens, and the central curvature radius of the image-side surface of the related lens of the present disclosure satisfy the relational expressions, the camera optical lens 10 may satisfy a large-aperture, ultra-thinness and wide-angle while having good optical performance.

In this embodiment, a refractive index of the first lens L1 is defined as n1, and a following relational expression is satisfied: $1.70 \le n1 \le 2.10$, the first lens L1 can be made of a high-refractive-index material, which is beneficial to reducing the front-end aperture and improving the imaging quality.

In this embodiment, a focal length of the fourth lens L4 is defined as f4, a focal length of the fifth lens L5 is defined as f5, and a following relational expression is satisfied: $-4.00 \le f4f5 \le -0.60$, which satisfies a ratio of the focal length f4 of the fourth lens L4 to the focal length f5 of the fifth lens L5, within a specified range, a focal length value of the fourth lens L4 is close to a focal length value of the fifth lens L5, which helps smooth transition of light and improves image quality.

In this embodiment, an on-axis thickness of the second lens L2 is defined as d3, an on-axis thickness of the third lens L3 is defined as d5, and a following relational expression is satisfied: $1.20 \le d3/d5 \le 5.00$, which specifies a ratio of the on-axis thickness d3 of the second lens L2 to the on-axis thickness d5 of the third lens L3, and in a specified range, it is beneficial to developing a wide-angle camera lens.

In this embodiment, an object-side surface of the first lens L1 is convex in a paraxial region, an image-side surface of the first lens L1 is concave in the paraxial region, and the first lens L1 has a negative refractive power. In other optional embodiments, the object-side surface and the image-side surface of the first lens L1 may also be provided with other concave and convex distributions, and the first lens L1 may also have a positive refractive power.

In this embodiment, a focal length of the first lens L1 is defined as f1, and a following relational expression is satisfied: $-4.50 \leq f1/f \leq -1.40$, which specifies a ratio of the focal length f1 of the first lens L1 to the focal length f of the camera optical lens 10, and the refractive power is reasonably distributed, so that the camera lens has better imaging quality and lower sensitivity.

In this embodiment, a central curvature radius of an object-side surface of the first lens L1 is defined as R1, and a central curvature radius of an image-side surface of the first lens L1 is defined as R2, a following relational expression is satisfied: $0.24 \leq (R1+R2)/(R1-R2) \leq 2.57$, which specifies a shape of the first lens L1, within a specified range, the degree of deflection of light passing through the lens can be mitigated, which is beneficial to correcting the problems such as the aberration of the off-axis angle.

In this embodiment, an on-axis thickness of the first lens L1 is defined as d1, and a following relational expression is satisfied: $0.03 \leq d1/TTL \leq 0.20$, which specifies a ratio of the on-axis thickness d1 of the first lens L1 to the total optical length from the object-side surface of the first lens to an image plane of the camera optical lens 10 along an optic axis TTL of the camera optical lens 10, and is beneficial to achieving ultra-thinness.

In this embodiment, an object-side surface of the second lens L2 is concave in a paraxial region, an image-side surface of the second lens L2 is convex in the paraxial region, and the second lens L2 has a negative refractive power. In other optional embodiments, the object-side surface and the image-side surface of the second lens L2 may also be provided with other concave and convex distributions, and the second lens L2 may also have a positive refractive power.

In this embodiment, a focal length of the second lens L2 is defined as f2, and a following relational expression is satisfied: $-13.03 \leq f2/f \leq 18.87$, which specifies a ratio of the focal length f2 of the second lens L2 to the focal length f of the camera optical lens 10, and the refractive power is reasonably distributed, so that the camera lens has better imaging quality and lower sensitivity.

In this embodiment, an on-axis thickness d3 of the second lens L2 and the total optical length from the object-side surface of the first lens to an image plane of the camera optical lens 10 along an optic axis TTL of the camera optical lens 10 satisfy a following relational expression: $0.09 \leq d3/TTL \leq 0.20$, which specifies a ratio of the on-axis thickness d3 of the second lens L2 to the total optical length from the object-side surface of the first lens to an image plane of the camera optical lens 10 along an optic axis TTL of the camera optical lens 10, which is beneficial to achieving ultra-thinness.

In this embodiment, an object-side surface of the third lens L3 is convex in a paraxial region, an image-side surface of the third lens L3 is convex in the paraxial region, and the third lens L3 has a positive refractive power. In other optional embodiments, the object-side surface and the image-side surface of the third lens L3 may also be provided with other concave and convex distributions, and the third lens L3 may also have a negative refractive power.

In this embodiment, a central curvature radius of an object-side surface of the third lens L3 is defined as R5, and a central curvature radius of an image-side surface of the third lens L3 is defined as R6, and a following relational expression is satisfied: $-2.06 \leq (R5+R6)/(R5-R6) \leq -0.30$, which specifies a shape of the third lens L3 is, within a specified range, the degree of deflection of light passing through the lens can be mitigated, which is beneficial to correcting the problems such as the aberration of the off-axis angle.

In this embodiment, an on-axis thickness of the third lens L3 is defined as d5, and a following relational expression is satisfied: $0.03 \leq d5/TTL \leq 0.09$, which specifies a ratio of the on-axis thickness d5 of the third lens L3 to the total optical length from the object-side surface of the first lens to an image plane of the camera optical lens 10 along an optic axis TTL of the camera optical lens 10, which is beneficial to achieving ultra-thinness.

In this embodiment, an object-side surface of the fourth lens L4 is concave in a paraxial region, an image-side surface of the fourth lens L4 is convex in the paraxial region, and the fourth lens L4 has a negative refractive power. In other optional embodiments, the object-side surface and the image-side surface of the fourth lens L4 may also be provided with other concave and convex distributions, and the fourth lens L4 may also have a positive refractive power.

In this embodiment, a focal length f4 of the fourth lens L4 and a focal length f of the camera optical lens 10 satisfy a following relational expression: $-6.91 \leq f4/f \leq -1.58$, which specifies a ratio of the focal length f4 of the fourth lens L4 to the focal length f of the camera optical lens 10, and the refractive power is reasonably distributed, so that the system has better imaging quality and lower sensitivity.

In this embodiment, a central curvature radius of an object-side surface of the fourth lens L4 is defined as R7, and a central curvature radius of an image-side surface of the fourth lens L4 is defined as R8, and a following relational expression is satisfied: $-7.81 \leq (R7+R8)/(R7-R8) \leq -0.07$, which specifies a shape of the fourth lens L4, and within a specified range, the degree of deflection of light passing through the lens can be mitigated, which is beneficial to correcting the problems such as the aberration of the off-axis angle.

In the present embodiment, an on-axis thickness of the fourth lens L4 is defined as d7, and a following relational expression is satisfied: $0.01 \leq d7/TTL \leq 0.04$, which specifies a ratio of the on-axis thickness d7 of the fourth lens L4 to the total optical length from the object-side surface of the first lens to an image plane of the camera optical lens 10 along an optic axis TTL of the camera optical lens 10, which is beneficial to achieving ultra-thinness.

In this embodiment, an object-side surface of the fifth lens L5 is convex in a paraxial region, an image-side surface of the fifth lens L5 is concave in the paraxial region, and the fifth lens L5 has a positive refractive power. In other optional embodiments, the object-side surface and the image-side surface of the fifth lens L5 may also be provided with other concave and convex distributions, and the fifth lens L5 may also have a negative refractive power.

In this embodiment, a focal length f5 of the fifth lens L5 and a focal length f of the camera optical lens 10 satisfy a following relational expression: $1.70 \leq f5/f \leq 3.63$, which specifies a ratio of the focal length f5 of the fifth lens L5 to the focal length f of the camera optical lens 10, and the refractive power is reasonably distributed, so that the system has better imaging quality and lower sensitivity.

In this embodiment, a central curvature radius of an object-side surface of the fifth lens L5 is defined as R9, a central curvature radius of an image-side surface of the fifth lens L5 is defined as R10, a following relational expression is satisfied: $-2.38 \leq (R9+R10)/(R9-R10) \leq -0.34$, which specifies a shape of the fifth lens L5, within a specified range, the degree of deflection of light passing through the lens can be mitigated, which is beneficial to correcting the problems such as the aberration of the off-axis angle.

In this embodiment, an on-axis thickness of the fifth lens L5 is defined as d9, and a following relational expression is satisfied: 0.03≤d9/TTL≤0.15, which specifies a ratio of the on-axis thickness d9 of the fifth lens L5 to the total optical length from the object-side surface of the first lens to an image plane of the camera optical lens 10 along an optic axis TTL of the camera optical lens 10, which is beneficial to achieving ultra-thinness.

In this embodiment, an object-side surface of the sixth lens L6 is convex in a paraxial region, an image-side surface of the sixth lens L6 is concave in the paraxial region, and the sixth lens L6 has a positive refractive power. In other optional embodiments, the object-side surface and the image-side surface of the sixth lens L6 may also be provided with other concave and convex distributions, and the sixth lens L6 may also have a negative refractive power.

In this embodiment, a focal length of the sixth lens L6 is defined as f6, and a following relational expression is satisfied: −20.00≤f6/f≤49.00, which specifies a ratio of the focal length f6 of the sixth lens L6 to the focal length f of the camera optical lens 10, and the refractive power is reasonably distributed, so that the system has better imaging quality and lower sensitivity.

In this embodiment, a central curvature radius of an object-side surface of the sixth lens L6 is defined as R11, and a central curvature radius of an image-side surface of the sixth lens L6 is defined as R12, a following relational expression is satisfied: −70.00≤(R11+R12)/(R11−R12) ≤11.35, which specifies a shape of the sixth lens L6, within a specified range, the degree of deflection of light passing through the lens can be mitigated, which is beneficial to correcting the problems such as the aberration of the off-axis angle.

In this embodiment, an on-axis thickness of the sixth lens L6 is defined as d11, and a following relational expression is satisfied: 0.02≤d11/TTL≤0.07, which specifies a ratio of the on-axis thickness d11 of the sixth lens L6 to the total optical length from the object-side surface of the first lens to an image plane of the camera optical lens 10 along an optic axis TTL of the camera optical lens 10, which is beneficial to achieving ultra-thinness.

In this embodiment, an object-side surface of the seventh lens L7 is convex in a paraxial region, an image-side surface of the seventh lens L7 is concave in the paraxial region, and the seventh lens L7 has a positive refractive power. In other optional embodiments, the object-side surface and the image-side surface of the seventh lens L7 may also be provided with other concave and convex distributions, and the seventh lens L7 may also have a negative refractive power.

In this embodiment, a focal length of the seventh lens L7 is defined as f7, the focal length of the seventh lens L7 and the focal length of the camera optical lens 10 satisfy a following relational expression: 4.60≤f7/f≤70.00, which specifies a ratio of the focal length f7 of the seventh lens L7 to the focal length f of the camera optical lens 10, and the refractive power is reasonably distributed, so that the system has better imaging quality and lower sensitivity.

In this embodiment, a central curvature radius of an object-side surface of the seventh lens L7 is defined as R13, a central curvature radius of an image-side surface of the seventh lens L7 is defined as R14, and a following relational expression is satisfied: −17.00≤(R13+R14)/(R13−R14) ≤39.00, which specifies a shape of the seventh lens L7, within a specified range, the degree of deflection of light passing through the lens can be mitigated, which is beneficial to correcting the problems such as the aberration of the off-axis angle.

In the present embodiment, an on-axis thickness of the seventh lens L7 is defined as d13, and a following relational expression is satisfied: 0.04≤d13/TTL≤0.25, which specifies a ratio of the on-axis thickness d13 of the seventh lens L7 to the total optical length from the object-side surface of the first lens to an image plane of the camera optical lens 10 along an optic axis TTL of the camera optical lens 10, which is beneficial to achieving ultra-thinness.

In this embodiment, a f-number of the camera optical lens 10 is defined as FNO, and a following relational expression is satisfied: FNO≤1.30, so that the camera lens meets a requirement of a large-aperture.

The camera optical lens 10 of the present disclosure will be described below by way of example. The symbols recited in each example are shown below. The units of the focal length, the on-axis distance, the central curvature radius, the on-axis thickness, the inflection point position, and the stationary point position are mm.

TTL: The unit of the total optical length from the object-side surface of the first lens to an image plane of the camera optical lens 10 along an optic axis (the on-axis distance from the object-side surface of the first lens L1 to the image surface Si) is mm.

In addition, the object-side surface and/or the image-side surface of each lens may also be provided with an inflection point and/or a stationary point, so as to meet high-quality imaging requirements.

Table 1 shows design data of the camera optical lens 10 according to Embodiment 1 of the present disclosure, the specific implementable solution, refer to the following.

TABLE 1

| | R | | d | | nd | | vd |
|---|---|---|---|---|---|---|---|
| S1 | ∞ | d0 = | −30.780 | | | | |
| R1 | 35.845 | d1 = | 2.650 | nd1 | 1.9037 | v1 | 31.32 |
| R2 | 11.705 | d2 = | 9.653 | | | | |
| R3 | −22.828 | d3 = | 13.440 | nd2 | 1.7400 | v2 | 28.29 |
| R4 | −69.229 | d4 = | 0.200 | | | | |
| R5 | 24.716 | d5 = | 5.540 | nd3 | 1.9037 | v3 | 31.32 |
| R6 | −73.050 | d6 = | 6.842 | | | | |
| R7 | −23.546 | d7 = | 1.800 | nd4 | 1.8467 | v4 | 23.83 |
| R8 | −80.685 | d8 = | 0.200 | | | | |
| R9 | 20.156 | d9 = | 5.620 | nd5 | 1.9108 | v5 | 35.26 |
| R10 | 111.436 | d10 = | 2.918 | | | | |
| R11 | 31.743 | d11 = | 2.310 | nd6 | 1.8061 | v6 | 40.73 |
| R12 | 39.524 | d12 = | 6.397 | | | | |
| R13 | 17.951 | d13 = | 3.607 | nd7 | 1.8061 | v7 | 40.73 |
| R14 | 29.869 | d14 = | 3.000 | | | | |
| R15 | ∞ | d15 = | 0.500 | ndg | 1.4585 | vg | 67.82 |
| R16 | ∞ | d16 = | 5.267 | | | | |

Wherein, the meaning of each symbol is as follows:

S1: aperture;

R: central curvature radius at the center of the optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;
R7: central curvature radius of the object-side surface of the fourth lens L4;
R8: central curvature radius of the image-side surface of the fourth lens L4;
R9: central curvature radius of the object-side surface of the fifth lens L5;
R10: central curvature radius of the image-side surface of the fifth lens L5;
R11: central curvature radius of the object-side surface of the sixth lens L6;
R12: central curvature radius of the image-side surface of the sixth lens L6;
R13: central curvature radius of the object-side surface of the seventh lens L7;
R14: central curvature radius of the image-side surface of the seventh lens L7;
R15: central curvature radius of the object-side surface of the optical filter GF;
R16: central curvature radius of the image-side surface of the optical filter GF;
d: on-axis thickness of lenses, on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the optical filter GF
d15: on-axis thickness of the optical filter GF;
d16: on-axis distance from the image-side surface of the optical filter GF to the image surface Si;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7; and
vg: abbe number of the optical filter GF.

Table 2 shows aspheric surface data of the sixth lens L6 and the seventh lens L7 in the camera optical lens 10 according to Embodiment 1 of the present disclosure.

TABLE 2

| | Conic Coefficient | Aspherical Coefficient | | | | |
|---|---|---|---|---|---|---|
| | k | A4 | A6 | A8 | A10 | A12 |
| R11 | −3.7924E+01 | 1.2430E−05 | −2.3178E−06 | 4.3545E−08 | −6.6120E−10 | 9.1925E−12 |
| R12 | 1.9704E+00 | −9.0058E−05 | 7.4032E−07 | −1.2236E−08 | 4.5122E−10 | −7.7888E−12 |
| R13 | −1.4168E+01 | 2.1209E−04 | −5.6482E−06 | 1.1425E−07 | −1.9224E−09 | 2.3506E−11 |
| R14 | −9.0448E+00 | −1.4884E−05 | −1.7416E−06 | 4.9751E−08 | −1.1837E−09 | 1.9398E−11 |

| | Conic Coefficient | Aspherical Coefficient | | | |
|---|---|---|---|---|---|
| | k | A14 | A16 | A18 | A20 |
| R11 | −3.7924E+01 | −8.9115E−14 | 4.9811E−16 | −1.4123E−18 | 1.5462E−21 |
| R12 | 1.9704E+00 | 8.8553E−14 | −6.5578E−16 | 2.5795E−18 | −3.6317E−21 |
| R13 | −1.4168E+01 | −1.8811E−13 | 9.1329E−16 | −2.3850E−18 | 2.5585E−21 |
| R14 | −9.0448E+00 | −2.0165E−13 | 1.2951E−15 | −4.7638E−18 | 7.9126E−21 |

d3: on-axis thickness of the second lens L2;
d4: on-axis distance from the image-side surface of the second lens L2 to the object-side surface of the third lens L3;
d5: on-axis thickness of the third lens L3;
d0: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;

Wherein, k is the conic coefficient, A4, A6, A8, A10, A12, A14, A16, A18, and A20 are aspheric coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

Wherein, x is a vertical distance between a point on the aspheric curve and the optical axis, and y is a depth of the aspheric surface (a vertical distance between a point on the aspheric surface at a distance x from the optical axis and a tangent plane tangent to a vertex on the aspheric optical axis).

For convenience, the aspheric surface of each lens surface uses the aspheric surface shown in the above formula (1). However, the present invention is not limited to the aspheric polynomial form represented by the formula (1).

Table 3 and Table 4 show design data of inflection points and stationary points of each lens in the camera optical lens 10 according to Embodiment 1 of the present disclosure. Wherein, PIR1 and PIR2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5, P6R1 and P6R2 respectively represent the object-side surface and the image-side surface of the fifth lens L6, P7R1 and P7R2 respectively represent the object-side surface and the image-side surface of the fifth lens L7. The corresponding data in the column "Inflection point position" is the vertical distance from the inflection point provided with the surface of each lens to the optical axis of the camera optical lens 10. The corresponding data in the column "Stationary point position" is a vertical distance from the stationary point provided with the surface of each lens to the optical axis of the camera optical lens 10.

TABLE 3

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 1 | 4.635 | / |
| P6R2 | 0 | / | / |
| P7R1 | 0 | / | / |
| P7R2 | 2 | 5.585 | 9.745 |

TABLE 4

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 9.305 |
| P6R2 | 0 | / |
| P7R1 | 0 | / |
| P7R2 | 0 | / |

Figure 2:
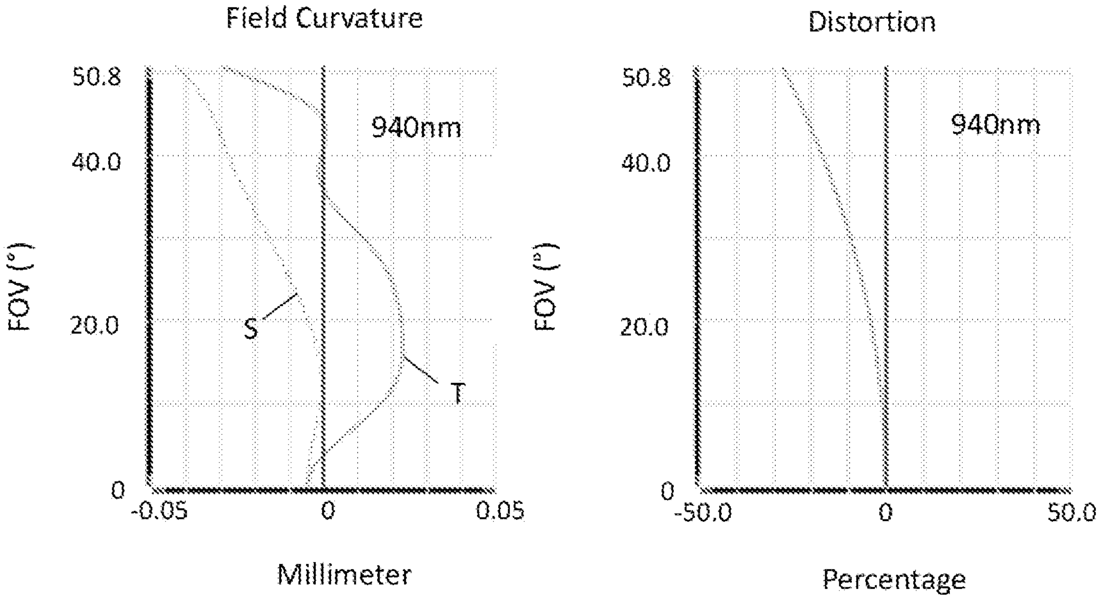
FIG. 2 is a schematic diagram of field curvature and distortion of the camera optical lens shown in FIG. 1.
Figure 3:
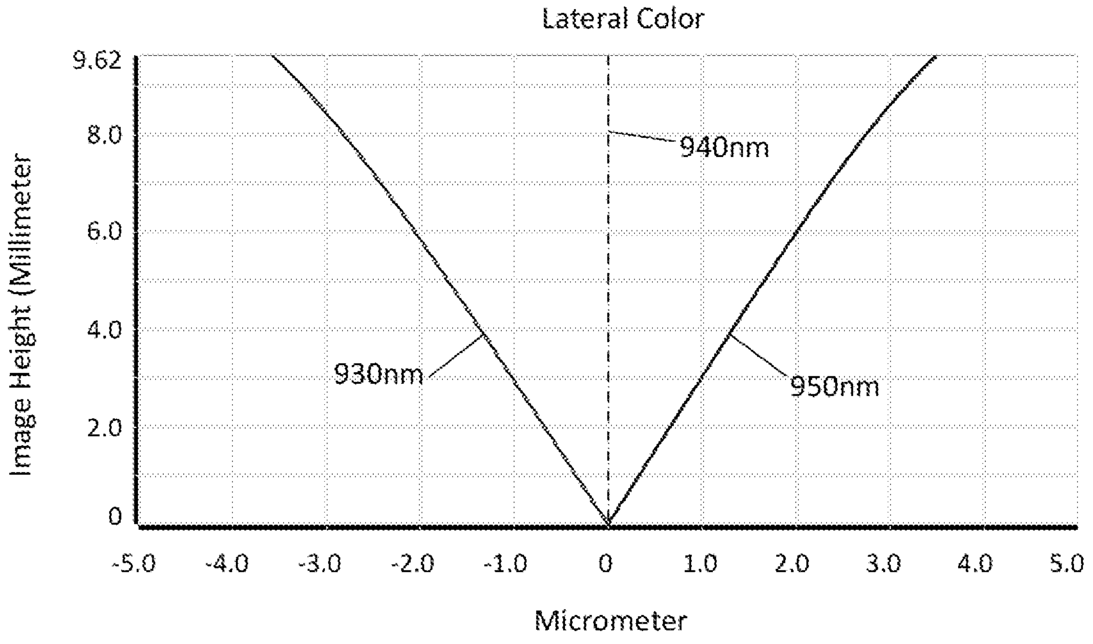
FIG. 3 is a schematic diagram of lateral color of the camera optical lens shown in FIG. 1.
Figure 4:
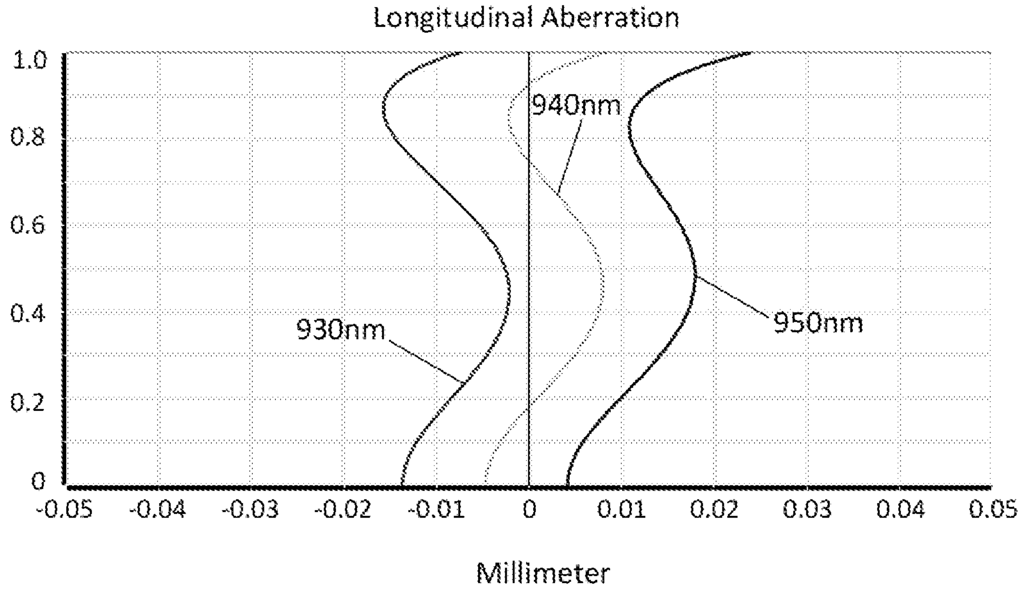
FIG. 4 is a schematic diagram of longitudinal aberration of the camera optical lens shown in FIG. 1.

FIG. 2 shows field curvature and distortion of light with a wavelength of 940 nm after passing through the camera optical lens 10. The field curvature S in FIG. 2 is the field curvature in a sagittal direction, and T is the field curvature in a meridional direction. FIG. 3 and FIG. 4 respectively show lateral color and longitudinal aberration of light with wavelengths 930 nm, 940 nm and 950 nm after passing through the camera optical lens 10.

As shown in Table 25, Embodiment 1 satisfies each relational expression.

In this embodiment, the entrance pupil diameter ENPD of the camera optical lens 10 is 8.361 mm, the full field of view image height IH in a diagonal direction is 9.615 mm, and the field of view FOV in the diagonal direction is 101.60°, so that the camera optical lens 10 meets the design requirements of a large-aperture, wide-angle, ultra-thinness, lower-sensitivity and medium- to long-range distance imaging, its on-axis and off-axis chromatic aberrations are fully corrected, and has good optical characteristics.

Embodiment 2

Figure 5:
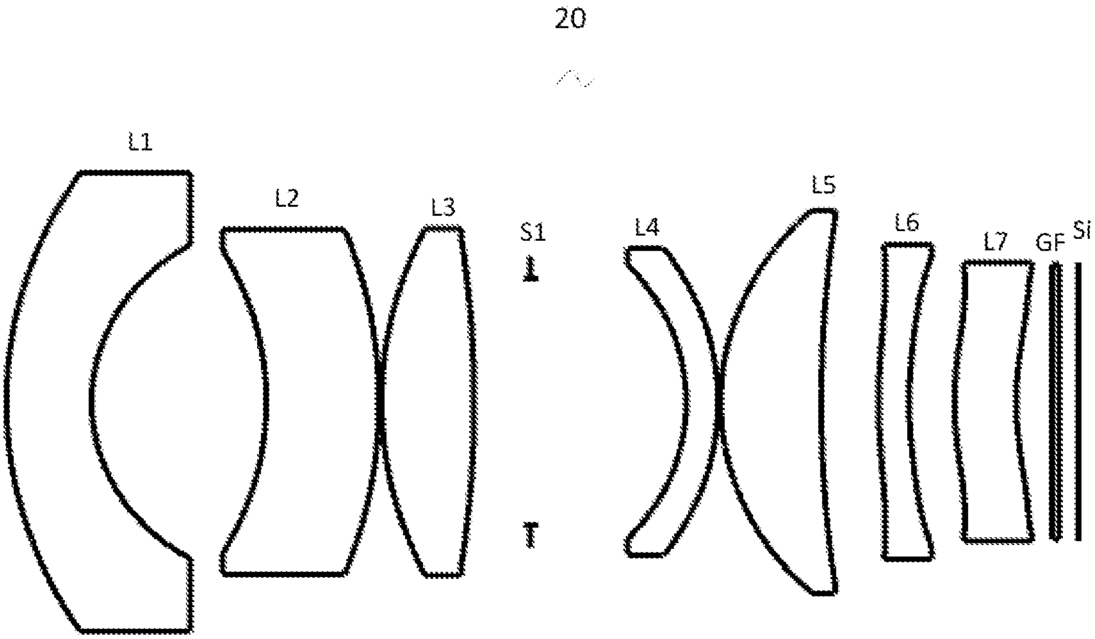
FIG. 5 is a structural schematic diagram of a camera optical lens according to Embodiment 2 of the present disclosure.

FIG. 5 is a structural schematic diagram of a camera optical lens 20 in Embodiment 2, Embodiment 2 is substantially the same as Embodiment 1, and the symbol meaning thereof is also the same as that of Embodiment 1, so the same parts are not described herein again, and only differences are listed below.

In this embodiment, the sixth lens L6 has a negative refractive power.

Table 5 shows design data of the camera optical lens 20 according to Embodiment 2 of the present disclosure.

TABLE 5

| | R | d | | nd | | vd | |
|---|---|---|---|---|---|---|---|
| S1 | ∞ | d0 = | −35.959 | | | | |
| R1 | 30.467 | d1 = | 5.844 | nd1 | 1.9037 | v1 | 31.32 |
| R2 | 13.139 | d2 = | 11.972 | | | | |
| R3 | −22.160 | d3 = | 7.728 | nd2 | 1.7400 | v2 | 28.29 |
| R4 | −35.127 | d4 = | 0.190 | | | | |
| R5 | 28.500 | d5 = | 6.334 | nd3 | 1.9037 | v3 | 31.32 |
| R6 | −83.515 | d6 = | 14.559 | | | | |
| R7 | −14.519 | d7 = | 2.175 | nd4 | 1.8467 | v4 | 23.83 |
| R8 | −18.786 | d8 = | 0.196 | | | | |
| R9 | 18.876 | d9 = | 6.877 | nd5 | 1.9108 | v5 | 35.26 |
| R10 | 93.985 | d10 = | 3.940 | | | | |
| R11 | 37.639 | d11 = | 2.100 | nd6 | 1.8061 | v6 | 40.73 |
| R12 | 31.543 | d12 = | 3.103 | | | | |
| R13 | 23.659 | d13 = | 4.239 | nd7 | 1.8061 | v7 | 40.73 |
| R14 | 22.451 | d14 = | 2.472 | | | | |
| R15 | ∞ | d15 = | 0.500 | ndg | 1.4585 | vg | 67.82 |
| R16 | ∞ | d16 = | 1.303 | | | | |

Table 6 shows aspheric surface data of the sixth lens L6 and the seventh lens L7 in the camera optical lens 20 according to Embodiment 2 of the present disclosure.

TABLE 6

| | Conic Coefficient | Aspherical Coefficient | | | | |
|---|---|---|---|---|---|---|
| | k | A4 | A6 | A8 | A10 | A12 |
| R11 | −6.2054E+01 | 1.8608E−05 | −2.3003E−06 | 4.3612E−08 | −6.6162E−10 | 9.1923E−12 |
| R12 | −6.2216E−01 | −1.0041E−04 | 7.8118E−07 | −1.2357E−08 | 4.4822E−10 | −7.8074E−12 |
| R13 | −3.0289E+01 | 1.0604E−04 | −5.6678E−06 | 1.1514E−07 | −1.9171E−09 | 2.3536E−11 |
| R14 | −3.3281E+00 | −9.8317E−05 | −1.7091E−06 | 5.1415E−08 | −1.1713E−09 | 1.9463E−11 |

TABLE 6-continued

| | Conic Coefficient | Aspherical Coefficient | | | |
|---|---|---|---|---|---|
| | k | A14 | A16 | A18 | A20 |
| R11 | −6.2054E+01 | −8.9100E−14 | 4.9851E−16 | −1.4076E−18 | 1.4948E−21 |
| R12 | −6.2216E−01 | 8.8509E−14 | −6.5604E−16 | 2.5739E−18 | −3.7120E−21 |
| R13 | −3.0289E+01 | −1.8802E−13 | 9.1354E−16 | −2.3953E−18 | 2.3152E−21 |
| R14 | −3.3281E+00 | −2.0138E−13 | 1.2968E−15 | −4.7468E−18 | 8.5019E−21 |

Table 7 and Table 8 show design data of inflection points and stationary points of each lens in the camera optical lens 20 according to Embodiment 2 of the present disclosure.

TABLE 7

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 1 | 4.505 | / |
| P6R2 | 1 | 10.185 | / |
| P7R1 | 1 | 4.695 | / |
| P7R2 | 2 | 4.895 | 8.195 |

TABLE 8

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 9.355 |
| P6R2 | 0 | / |
| P7R1 | 1 | 8.465 |
| P7R2 | 0 | / |

Figure 6:
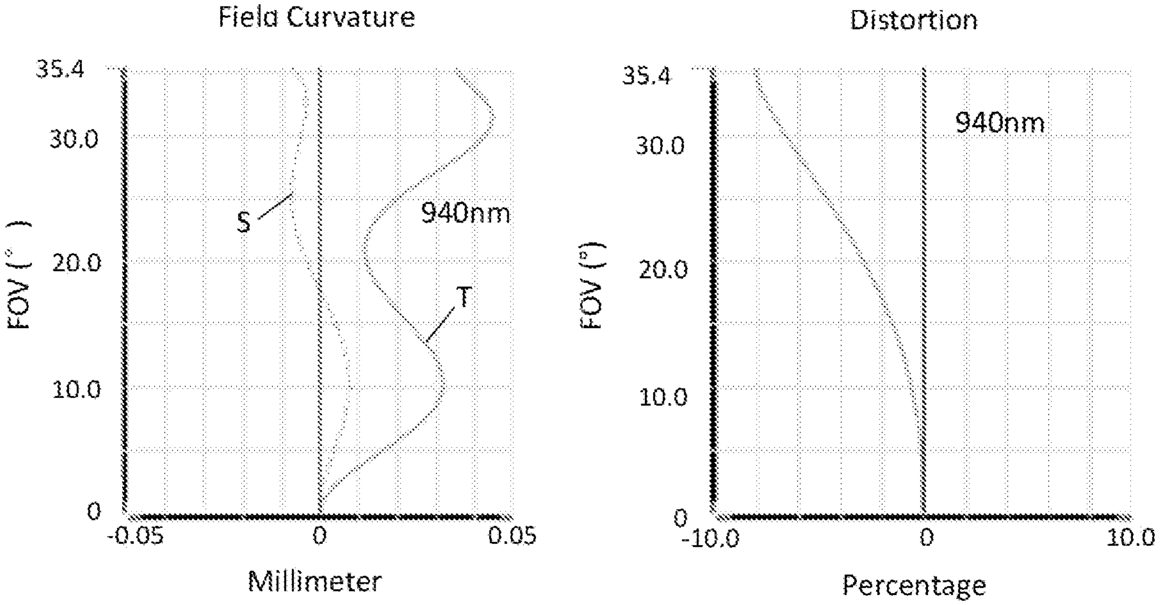
FIG. 6 is a schematic diagram of field curvature and distortion of the camera optical lens shown in FIG. 5.
Figure 7:
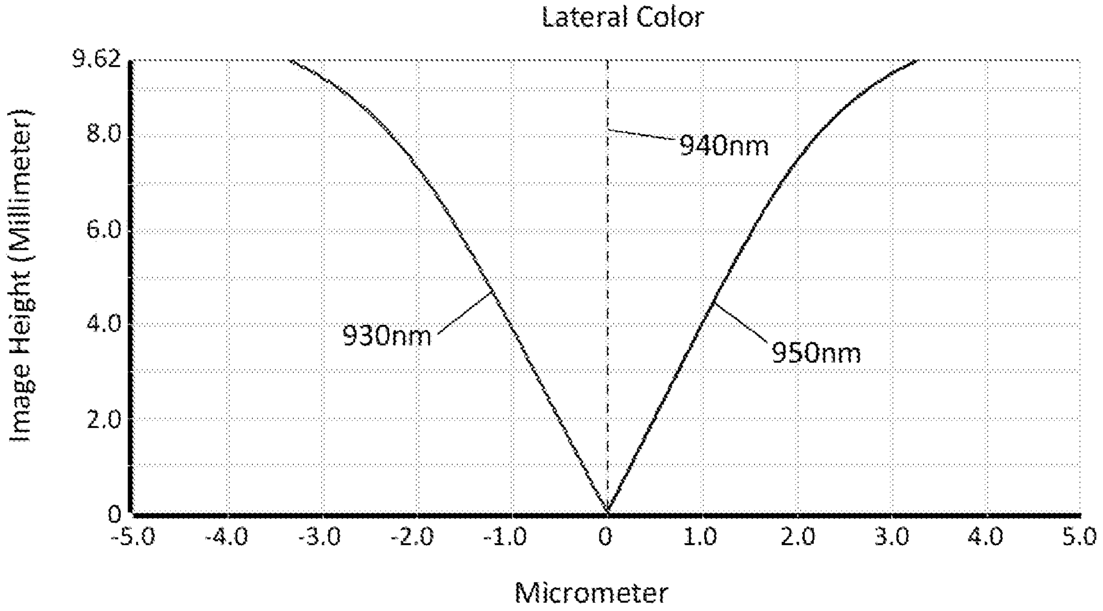
FIG. 7 is a schematic diagram of lateral color of the camera optical lens shown in FIG. 5.
Figure 8:
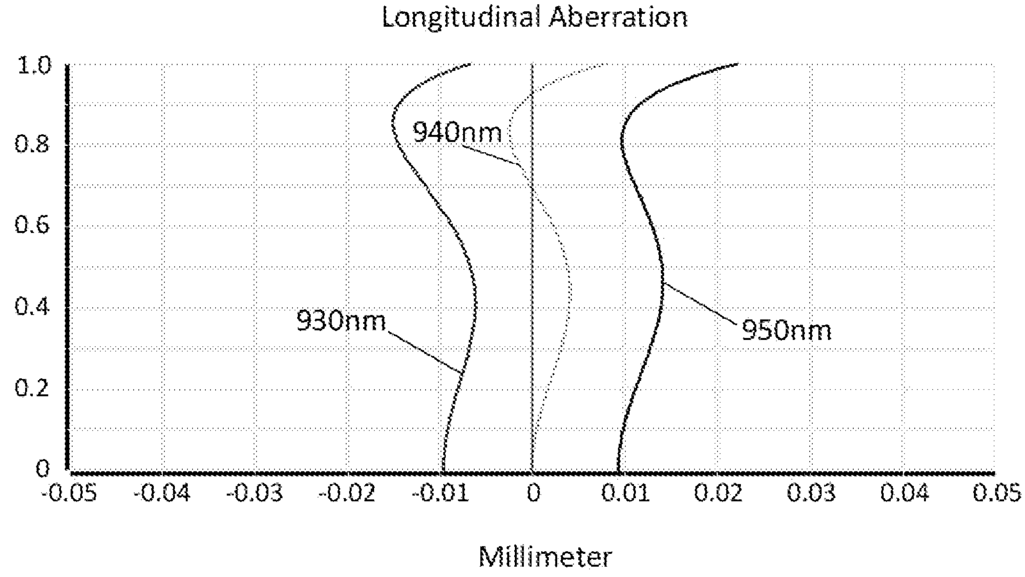
FIG. 8 is a schematic diagram of longitudinal aberration of the camera optical lens shown in FIG. 5.

FIG. 6 shows field curvature and distortion of light with a wavelength of 940 nm after passing through the camera optical lens 20. The field curvature S in FIG. 6 is the field curvature in a sagittal direction, and T is the field curvature in a meridional direction. FIG. 7 and FIG. 8 respectively show lateral color and longitudinal aberration of light with wavelengths 930 nm, 940 nm and 950 nm after passing through the camera optical lens 20.

As shown in Table 25, Embodiment 2 satisfies each relational expression.

In this embodiment, the entrance pupil diameter ENPD of the camera optical lens 20 is 11.315 mm, the full field of view image height IH in a diagonal direction is 9.615 mm, and the field of view FOV in the diagonal direction is 70.84°, so that the camera optical lens 20 meets the design requirements of a large-aperture, wide-angle, ultra-thinness, lower-sensitivity and medium- to long-range distance imaging, its on-axis and off-axis chromatic aberrations are fully corrected, and has good optical characteristics.

Embodiment 3

Figure 9:
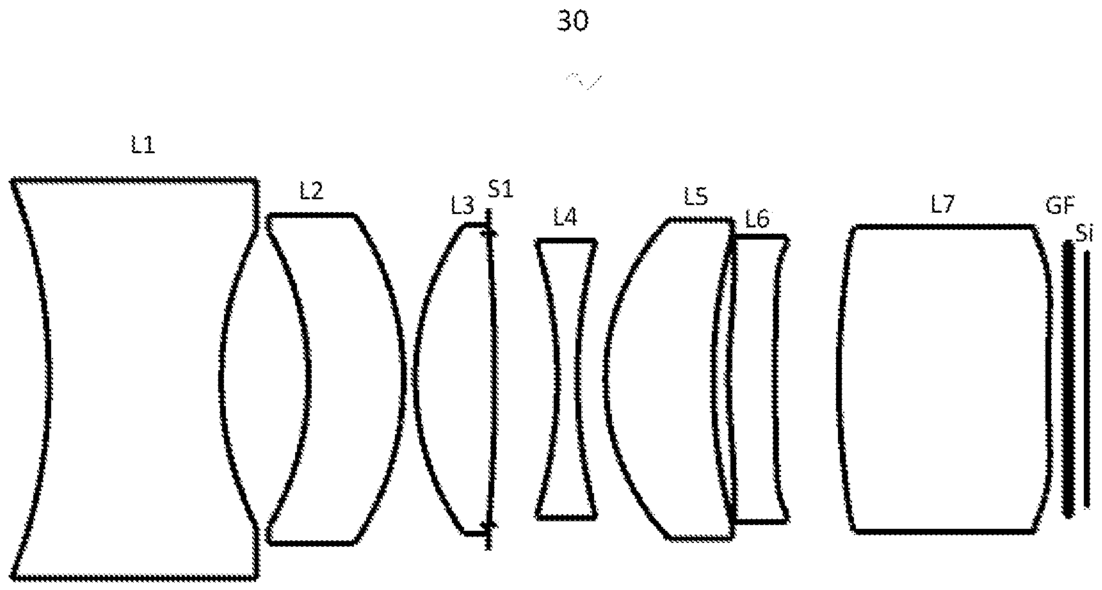
FIG. 9 is a structural schematic diagram of a camera optical lens according to Embodiment 3 of the present disclosure.

FIG. 9 is a structural schematic diagram of a camera optical lens 30 in Embodiment 3, Embodiment 3 is substantially the same as Embodiment 1, and the symbol meaning is the same as that of Embodiment 1, so the same parts are not described herein again, and only differences are listed below.

In this embodiment, an object-side surface of the first lens L1 is concave in a paraxial region, the second lens L2 has a positive refractive power, and an image-side surface of the fourth lens L4 is concave in the paraxial region.

Table 9 shows design data of the camera optical lens 30 according to Embodiment 3 of the present disclosure.

TABLE 9

| | R | d | | nd | | vd | |
|---|---|---|---|---|---|---|---|
| S1 | ∞ | d0 = | −34.210 | | | | |
| R1 | −44.644 | d1 = | 13.403 | nd1 | 1.7130 | v1 | 53.87 |
| R2 | 27.031 | d2 = | 6.779 | | | | |
| R3 | −24.053 | d3 = | 7.423 | nd2 | 1.7400 | v2 | 28.29 |
| R4 | −24.405 | d4 = | 0.893 | | | | |
| R5 | 22.090 | d5 = | 6.180 | nd3 | 1.9037 | v3 | 31.32 |
| R6 | −143.825 | d6 = | 4.854 | | | | |
| R7 | −38.372 | d7 = | 1.600 | nd4 | 1.8467 | v4 | 23.83 |
| R8 | 44.320 | d8 = | 2.175 | | | | |
| R9 | 18.896 | d9 = | 8.385 | nd5 | 1.9108 | v5 | 35.26 |
| R10 | 46.376 | d10 = | 1.182 | | | | |
| R11 | 39.455 | d11 = | 3.600 | nd6 | 1.8061 | v6 | 40.73 |
| R12 | 101.714 | d12 = | 4.954 | | | | |
| R13 | 45.987 | d13 = | 16.282 | nd7 | 1.8061 | v7 | 40.73 |
| R14 | 61.462 | d14 = | 1.360 | | | | |
| R15 | ∞ | d15 = | 0.500 | ndg | 1.4585 | vg | 67.82 |
| R16 | ∞ | d16 = | 1.200 | | | | |

Table 10 shows aspheric surface data of the sixth lens L6 and the seventh lens L7 in the camera optical lens 30 according to Embodiment 3 of the present disclosure.

TABLE 10

| | Conic Coefficient | Aspherical Coefficient | | | | |
|---|---|---|---|---|---|---|
| | k | A4 | A6 | A8 | A10 | A12 |
| R11 | −6.0416E+01 | 1.1534E−05 | −2.2322E−06 | 4.3413E−08 | −6.6215E−10 | 9.2221E−12 |
| R12 | −6.8170E+00 | −7.9532E−05 | 8.1520E−07 | −1.3309E−08 | 4.5914E−10 | −7.6743E−12 |

TABLE 10-continued

| | | | | | | |
|---|---|---|---|---|---|---|
| R13 | −1.7591E+02 | 1.3519E−04 | −4.7935E−06 | 1.1390E−07 | −1.9441E−09 | 2.3473E−11 |
| R14 | −1.0743E+02 | −1.8145E−05 | −2.0508E−06 | 4.6609E−08 | −1.1704E−09 | 1.9592E−11 |

| | Conic Coefficient | Aspherical Coefficient | | | |
|---|---|---|---|---|---|
| | k | A14 | A16 | A18 | A20 |
| R11 | −6.0416E+01 | −8.8889E−14 | 4.9814E−16 | −1.4228E−18 | 1.5081E−21 |
| R12 | −6.8170E+00 | 8.8802E−14 | −6.5987E−16 | 2.5618E−18 | −3.4806E−21 |
| R13 | −1.7591E+02 | −1.8767E−13 | 9.1555E−16 | −2.3904E−18 | 2.4654E−21 |
| R14 | −1.0743E+02 | −2.0114E−13 | 1.2884E−15 | −4.8387E−18 | 8.1689E−21 |

Table 11 and Table 12 show design data of inflection points and stationary points of each lens in the camera optical lens 30 according to Embodiment 3 of the present disclosure.

TABLE 11

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 1 | 4.455 | / |
| P6R2 | 2 | 3.835 | 5.385 |
| P7R1 | 0 | / | / |
| P7R2 | 2 | 3.655 | 11.245 |

TABLE 12

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 10.445 |
| P6R2 | 0 | / |
| P7R1 | 0 | / |
| P7R2 | 1 | 6.015 |

Figure 10:
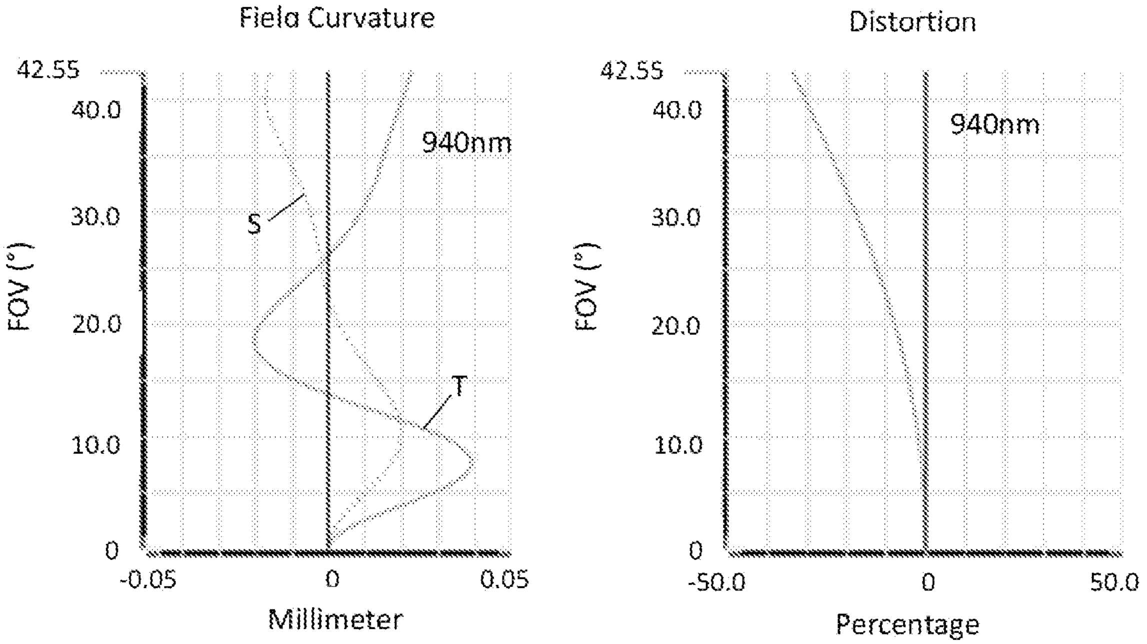
FIG. 10 is a schematic diagram of field curvature and distortion of the camera optical lens shown in FIG. 9.
Figure 11:
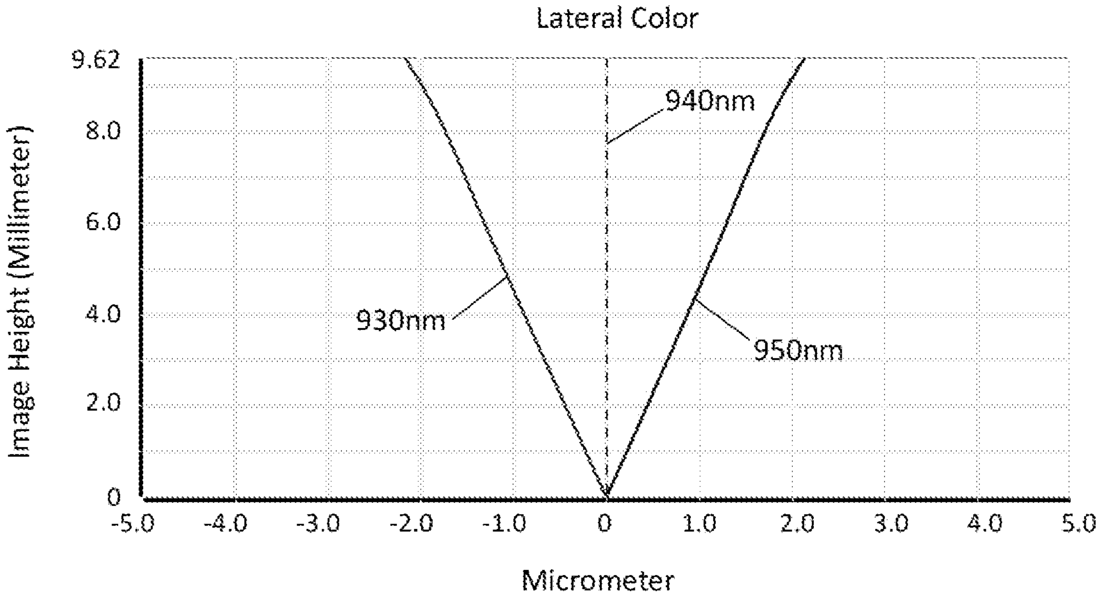
FIG. 11 is a schematic diagram of lateral color of the camera optical lens shown in FIG. 9.
Figure 12:
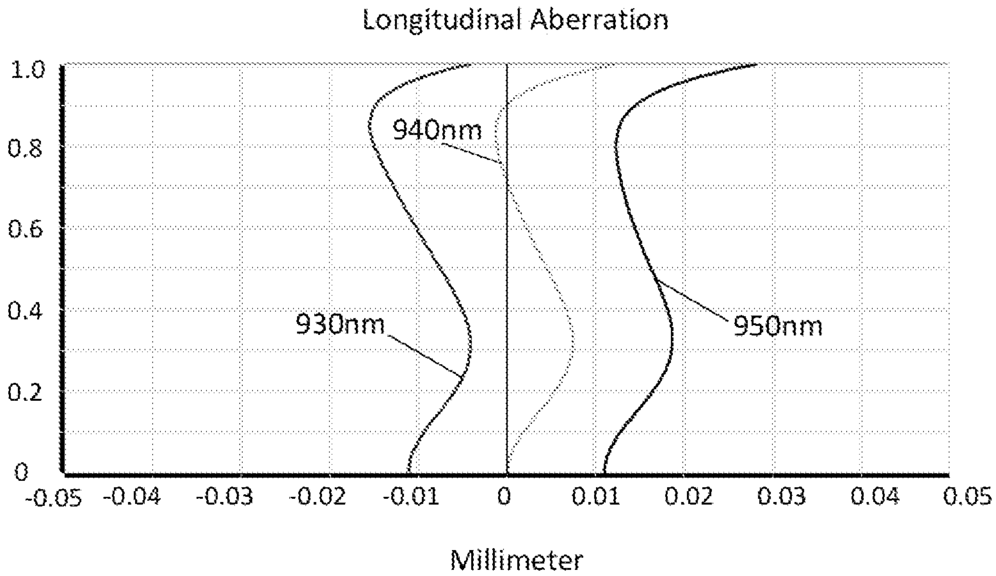
FIG. 12 is a schematic diagram of longitudinal aberration of the camera optical lens shown in FIG. 9.

FIG. 10 shows field curvature and distortion of light with a wavelength of 940 nm after passing through the camera optical lens 30. The field curvature S in FIG. 10 is the field curvature in a sagittal direction, and T is the field curvature in a meridional direction. FIG. 11 and FIG. 12 respectively show lateral color and longitudinal aberration of light with wavelengths 930 nm, 940 nm and 950 nm after passing through the camera optical lens 30. As shown in Table 25, Embodiment 3 satisfies each relational expression.

In this embodiment, the entrance pupil diameter ENPD of the camera optical lens 30 is 12.153 mm, the full field of view image height IH in a diagonal direction is 9.615 mm, and the field of view FOV in the diagonal direction is 85.11°, so that the camera optical lens 30 meets the design requirements of large-aperture, wide-angle, ultra-thinness, lower-sensitivity and medium- to long-range distance imaging, its on-axis and off-axis chromatic aberrations are fully corrected, and has good optical characteristics.

Embodiment 4

Figure 13:
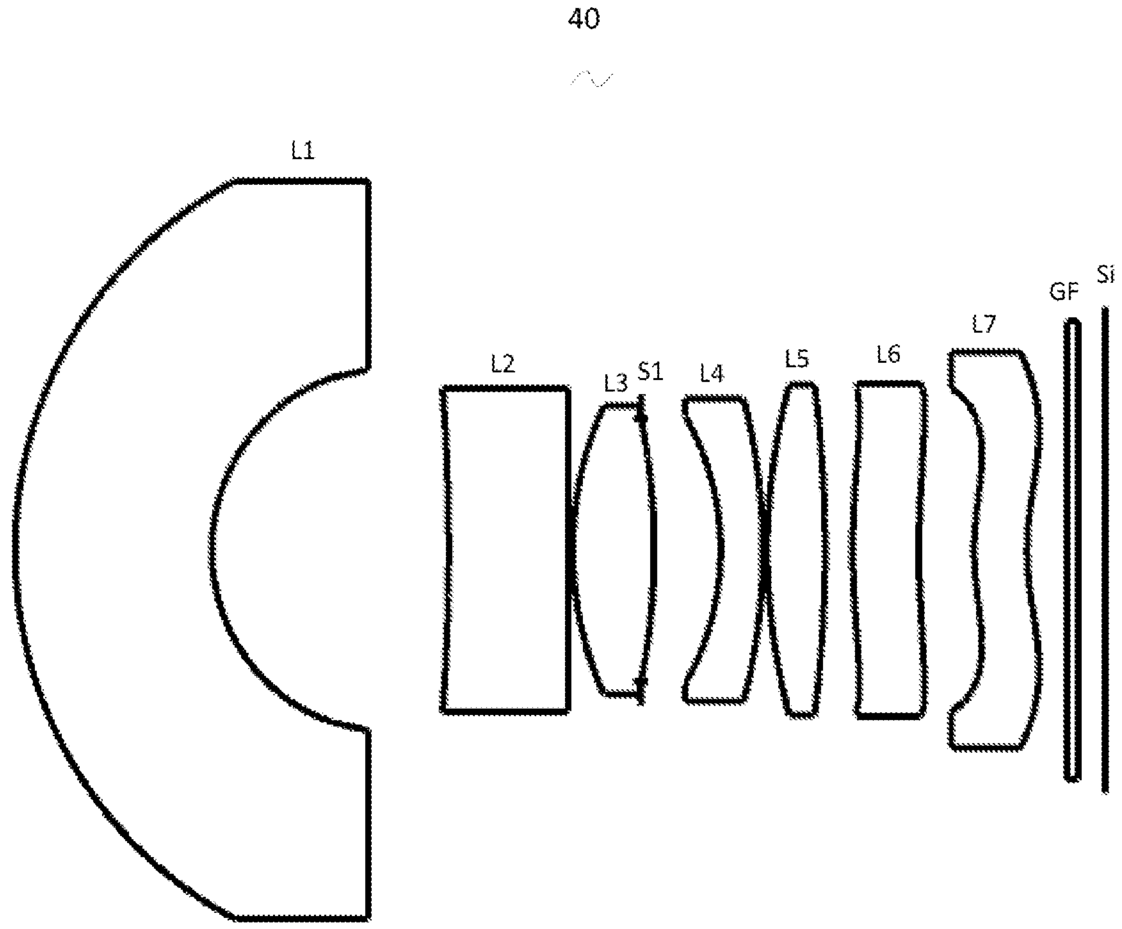
FIG. 13 is a structural schematic diagram of a camera optical lens according to Embodiment 4 of the present disclosure.

FIG. 13 is a structural schematic diagram of a camera optical lens 40 in Embodiment 4, Embodiment 4 is substantially the same as Embodiment 1, and the symbols are the same as those in Embodiment 1, so the same parts are not described herein again, and only differences are listed below.

In this embodiment, an image-side surface of the fifth lens L5 is convex in a paraxial region.

Table 13 shows design data of the camera optical lens 40 according to Embodiment 4 of the present disclosure.

TABLE 13

| | R | d | | nd | | vd | |
|---|---|---|---|---|---|---|---|
| S1 | ∞ | d0 = | −27.140 | | | | |
| R1 | 17.252 | d1 = | 8.532 | nd1 | 2.1042 | v1 | 17.02 |
| R2 | 7.587 | d2 = | 10.273 | | | | |
| R3 | −86.459 | d3 = | 5.189 | nd2 | 1.7400 | v2 | 28.29 |
| R4 | −1296.880 | d4 = | 0.190 | | | | |
| R5 | 14.129 | d5 = | 3.533 | nd3 | 1.9037 | v3 | 31.32 |
| R6 | −26.542 | d6 = | 2.883 | | | | |
| R7 | −10.960 | d7 = | 1.834 | nd4 | 1.8467 | v4 | 23.83 |
| R8 | −24.292 | d8 = | 0.196 | | | | |
| R9 | 25.621 | d9 = | 2.500 | nd5 | 1.9108 | v5 | 35.26 |
| R10 | −52.286 | d10 = | 1.199 | | | | |
| R11 | 27.734 | d11 = | 2.866 | nd6 | 1.8061 | v6 | 40.73 |
| R12 | 28.539 | d12 = | 2.402 | | | | |
| R13 | 11.226 | d13 = | 2.295 | nd7 | 1.8061 | v7 | 40.73 |
| R14 | 10.622 | d14 = | 1.715 | | | | |
| R15 | ∞ | d15 = | 0.500 | ndg | 1.4585 | vg | 67.82 |
| R16 | ∞ | d16 = | 1.194 | | | | |

Table 14 shows aspheric surface data of the sixth lens L6 and the seventh lens L7 in the camera optical lens 40 according to Embodiment 4 of the present disclosure.

TABLE 14

| | Conic Coefficient | Aspherical Coefficient | | | | |
|---|---|---|---|---|---|---|
| | k | A4 | A6 | A8 | A10 | A12 |
| R11 | −9.6464E+01 | 6.2496E−05 | −3.6998E−06 | 2.2072E−08 | −8.2547E−10 | 8.8536E−12 |
| R12 | −1.5351E+02 | −9.1973E−05 | 2.7279E−06 | −2.3790E−08 | −2.1343E−11 | −1.7875E−11 |
| R13 | −1.2084E+01 | −7.3405E−04 | −9.9341E−06 | 1.6800E−07 | −1.7911E−09 | 3.0219E−11 |
| R14 | −6.8598E+00 | −6.9922E−04 | −7.0965E−07 | 1.0421E−07 | −1.0453E−09 | 1.6217E−11 |

| | Conic Coefficient | Aspherical Coefficient | | | |
|---|---|---|---|---|---|
| | k | A14 | A16 | A18 | A20 |
| R11 | −9.6464E+01 | −2.1121E−13 | −5.5385E−16 | 3.0697E−17 | −5.7859E−19 |
| R12 | −1.5351E+02 | −4.3287E−14 | −1.1874E−15 | 8.3538E−18 | 2.3131E−19 |
| R13 | −1.2084E+01 | −1.6264E−13 | −3.6488E−15 | −1.2038E−16 | −4.8431E−18 |
| R14 | −6.8598E+00 | −2.5703E−13 | 8.8356E−16 | −3.3521E−18 | 1.1351E−19 |

Table 15 and Table 16 show design data of inflection points and stationary points of each lens in the camera optical lens 40 according to Embodiment 4 of the present disclosure.

TABLE 15

| | Number of inflection points | Inflection point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 3.625 |
| P6R2 | 1 | 3.895 |
| P7R1 | 1 | 2.255 |
| P7R2 | 1 | 2.675 |

TABLE 16

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 1 | 5.605 |
| P6R2 | 1 | 5.855 |
| P7R1 | 1 | 3.995 |
| P7R2 | 1 | 4.985 |

Figure 14:
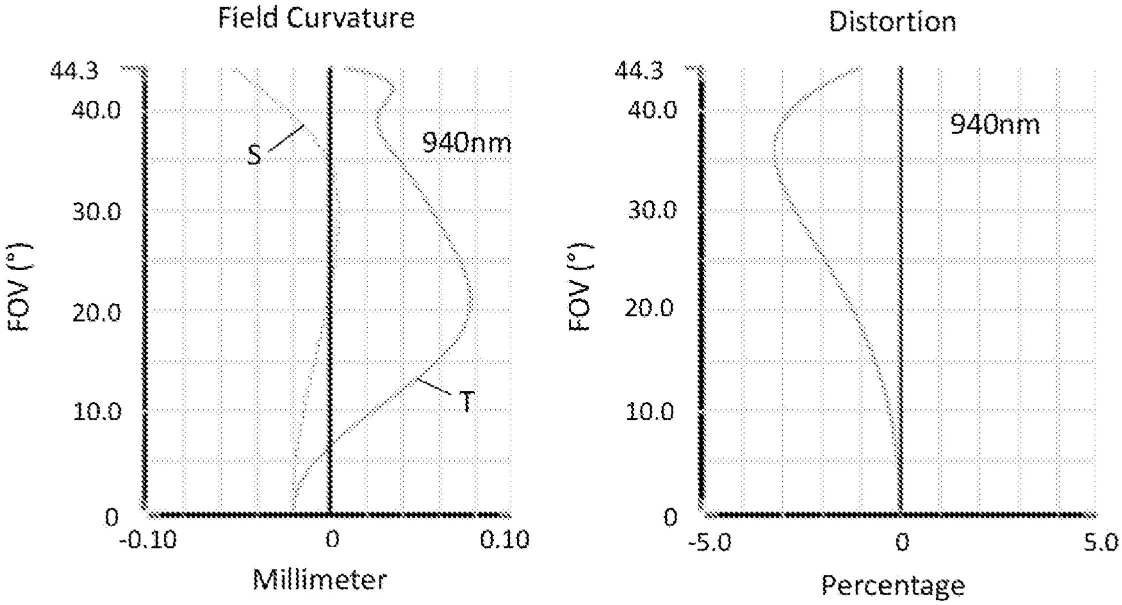
FIG. 14 is a schematic diagram of field curvature and distortion of the camera optical lens shown in FIG. 13.
Figure 15:
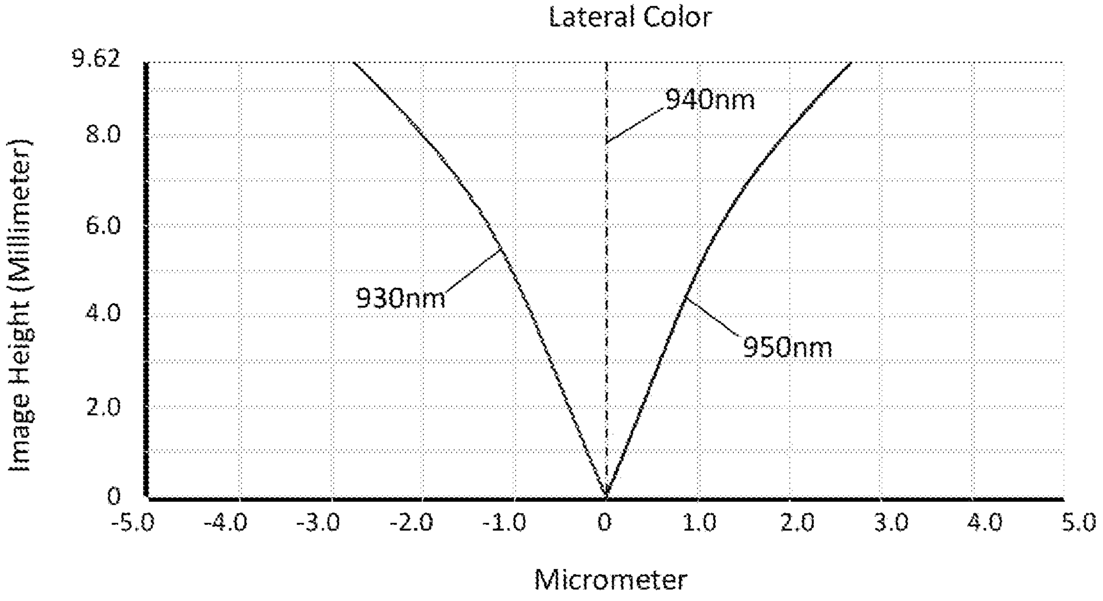
FIG. 15 is a schematic diagram of lateral color of the camera optical lens shown in FIG. 13.
Figure 16:
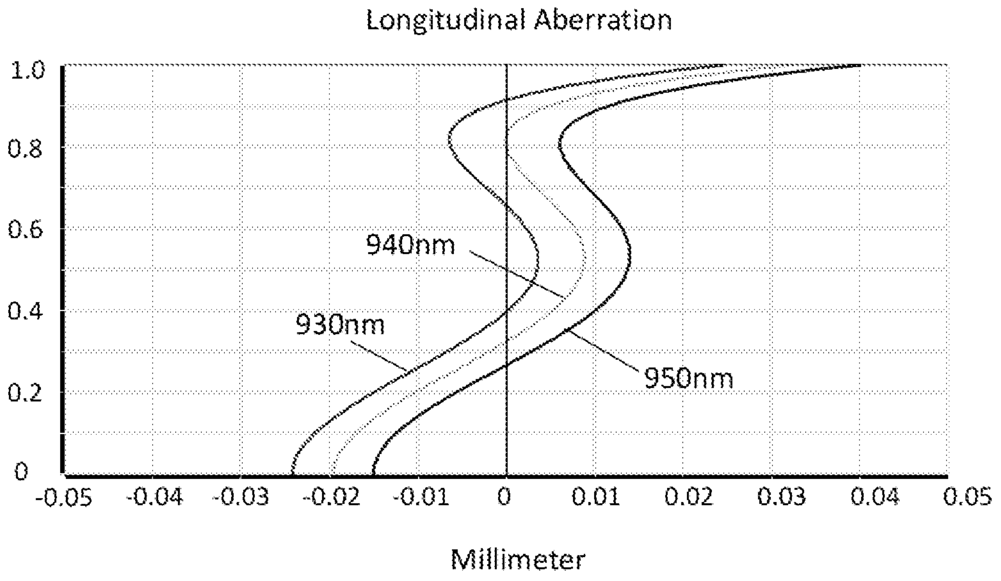
FIG. 16 is a schematic diagram of longitudinal aberration of the camera optical lens shown in FIG. 13.

FIG. 14 shows field curvature and distortion of light with a wavelength of 940 nm after passing through the camera optical lens 40. The field curvature S in FIG. 14 is the field curvature in a sagittal direction, and T is the field curvature in a meridional direction. FIG. 15 and FIG. 16 respectively show lateral color and longitudinal aberration of light with wavelengths 930 nm, 940 nm and 950 nm after passing through the camera optical lens 40.

As shown in Table 25, Embodiment 4 satisfies each relational expression.

In this embodiment, the entrance pupil diameter ENPD of the camera optical lens 40 is 7.644 mm, the full field of view image height IH in a diagonal direction is 9.615 mm, and the field of view FOV in the diagonal direction is 88.61°, so that the camera optical lens 40 meets the design requirements of large-aperture, wide-angle, ultra-thinness, lower-sensitivity and medium- to long-range distance imaging, its on-axis and off-axis chromatic aberrations are fully corrected, and has good optical characteristics.

Embodiment 5

Figure 17:
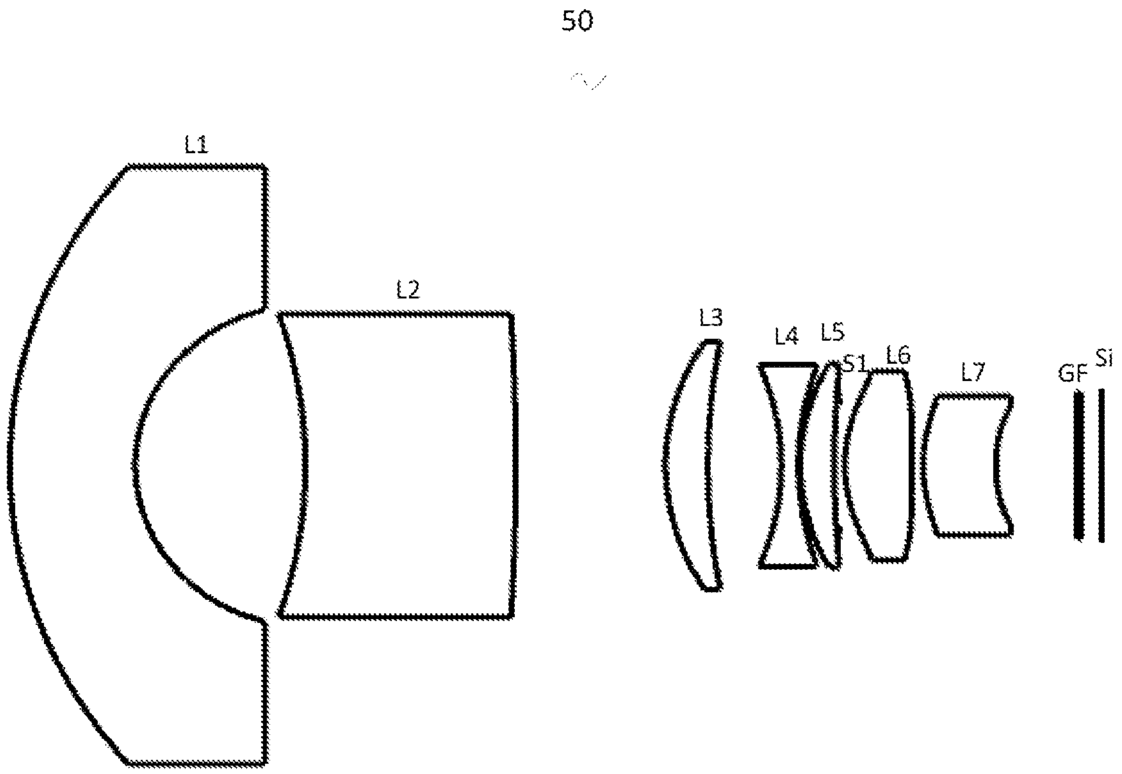
FIG. 17 is a structural schematic diagram of a camera optical lens according to Embodiment 5 of the present disclosure.

FIG. 17 is a structural schematic diagram of the camera optical lens 50 in Embodiment 5, Embodiment 5 is substantially the same as Embodiment 1, and the symbols are the same as those in Embodiment 1, so the same parts are not described herein again, and only differences are listed below.

In this embodiment, an image-side surface of the third lens L3 is concave in a paraxial region, and an image-side surface of the fourth lens L4 is concave in the paraxial region.

Table 17 shows design data of the camera optical lens 50 according to Embodiment 5 of the present disclosure.

TABLE 17

| | R | d | | nd | | vd | |
|---|---|---|---|---|---|---|---|
| S1 | ∞ | d0 = | −95.599 | | | | |
| R1 | 57.638 | d1 = | 14.472 | nd1 | 1.9037 | v1 | 31.32 |
| R2 | 20.165 | d2 = | 19.636 | | | | |
| R3 | −59.037 | d3 = | 24.298 | nd2 | 1.7400 | v2 | 28.29 |
| R4 | −292.232 | d4 = | 17.267 | | | | |
| R5 | 28.795 | d5 = | 4.883 | nd3 | 1.9037 | v3 | 31.32 |
| R6 | 83.464 | d6 = | 8.465 | | | | |
| R7 | −32.240 | d7 = | 2.000 | nd4 | 1.8467 | v4 | 23.83 |
| R8 | 37.971 | d8 = | 0.196 | | | | |
| R9 | 25.891 | d9 = | 3.939 | nd5 | 1.9108 | v5 | 35.26 |
| R10 | 146.967 | d10 = | 1.200 | | | | |
| R11 | 19.214 | d11 = | 7.720 | nd6 | 1.8061 | v6 | 40.73 |
| R12 | 303.248 | d12 = | 1.288 | | | | |
| R13 | 18.146 | d13 = | 8.429 | nd7 | 1.8061 | v7 | 40.73 |
| R14 | 20.462 | d14 = | 9.348 | | | | |
| R15 | ∞ | d15 = | 0.500 | ndg | 1.4585 | vg | 67.82 |
| R16 | ∞ | d16 = | 2.368 | | | | |

Table 18 shows aspheric surface data of the sixth lens L6 and the seventh lens L7 in the camera optical lens 50 according to Embodiment 5 of the present disclosure.

TABLE 18

| | Conic Coefficient | Aspherical Coefficient | | | | |
|---|---|---|---|---|---|---|
| | k | A4 | A6 | A8 | A10 | A12 |
| R11 | −9.8457E+00 | 1.5236E−04 | −2.1153E−06 | 3.7101E−08 | −6.8313E−10 | 9.4373E−12 |
| R12 | 6.7433E+02 | −9.0105E−05 | 9.3292E−07 | −2.0078E−08 | 4.2937E−10 | −7.6450E−12 |
| R13 | −1.5863E+01 | 2.1931E−04 | −5.4163E−06 | 1.1234E−07 | −1.9322E−09 | 2.3137E−11 |
| R14 | 4.2201E+00 | 4.6531E−05 | −1.1757E−06 | 3.4336E−08 | −1.2184E−09 | 2.2172E−11 |

| | Conic Coefficient | Aspherical Coefficient | | | |
|---|---|---|---|---|---|
| | k | A14 | A16 | A18 | A20 |
| R11 | −9.8457E+00 | −8.7139E−14 | 4.9200E−16 | −1.5271E−18 | 1.9804E−21 |
| R12 | 6.7433E+02 | 8.9739E−14 | −6.4630E−16 | 2.6119E−18 | −4.5847E−21 |
| R13 | −1.5863E+01 | −1.8294E−13 | 1.0238E−15 | −4.8289E−18 | 1.4631E−20 |
| R14 | 4.2201E+00 | −2.1130E−13 | 1.1508E−15 | −1.3535E−17 | 8.9145E−20 |

Table 19 and Table 20 show design data of inflection points and stationary points of each lens in the camera optical lens 50 according to Embodiment 5 of the present disclosure.

TABLE 19

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 1 | 9.385 | / |
| P6R2 | 2 | 1.855 | 11.405 |
| P7R1 | 1 | 7.905 | / |
| P7R2 | 0 | / | / |

TABLE 20

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 1 | 3.315 |
| P7R1 | 0 | / |
| P7R2 | 0 | / |

Figure 18:
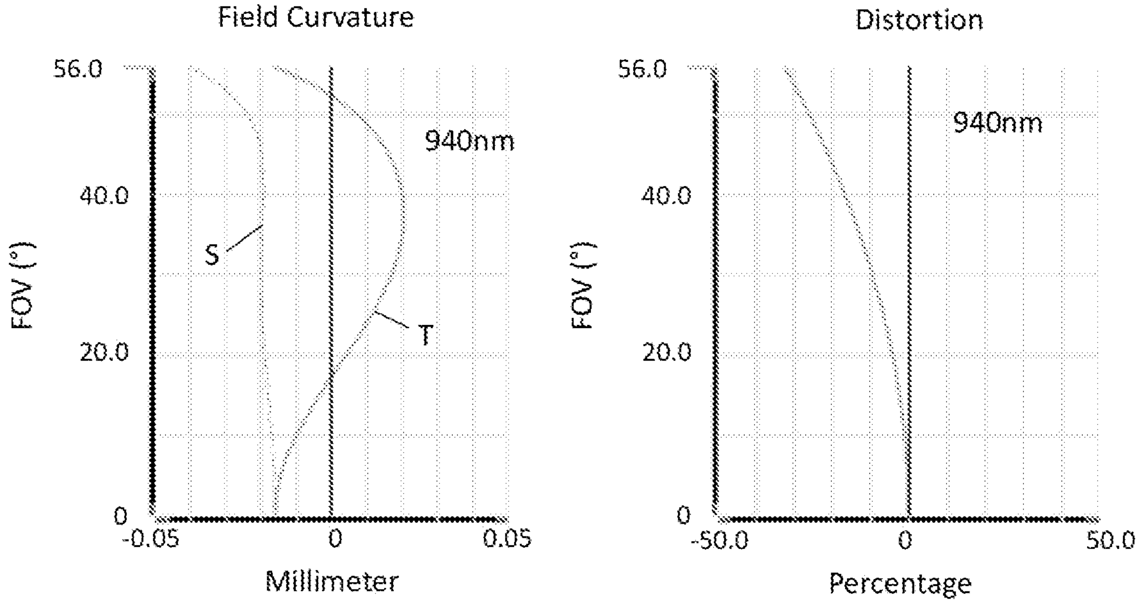
FIG. 18 is a schematic diagram of field curvature and distortion of the camera optical lens shown in FIG. 17.
Figure 19:
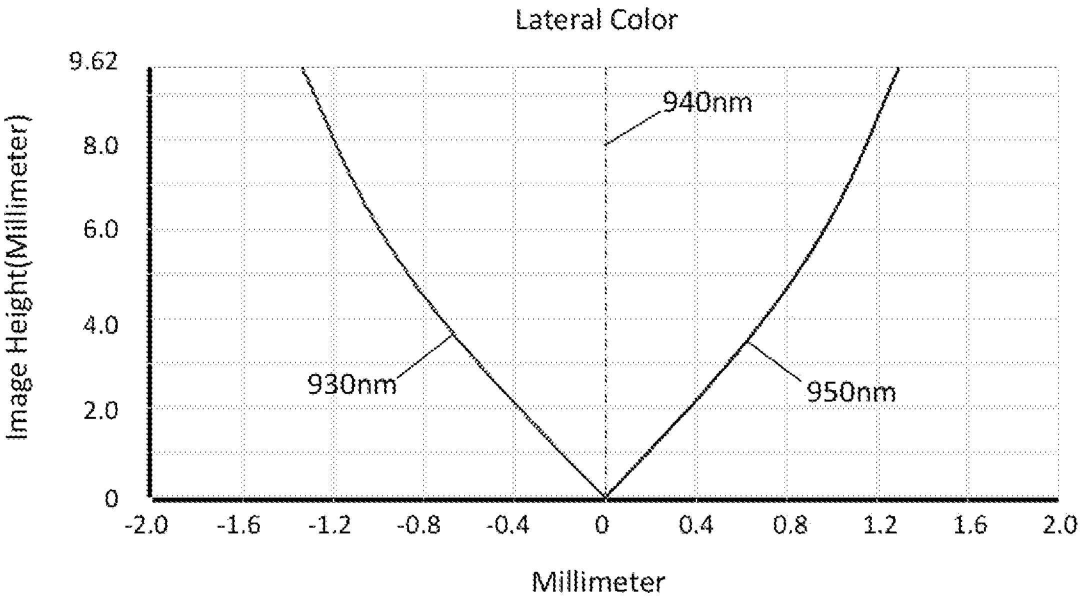
FIG. 19 is a schematic diagram of lateral color of the camera optical lens shown in FIG. 17.
Figure 20:
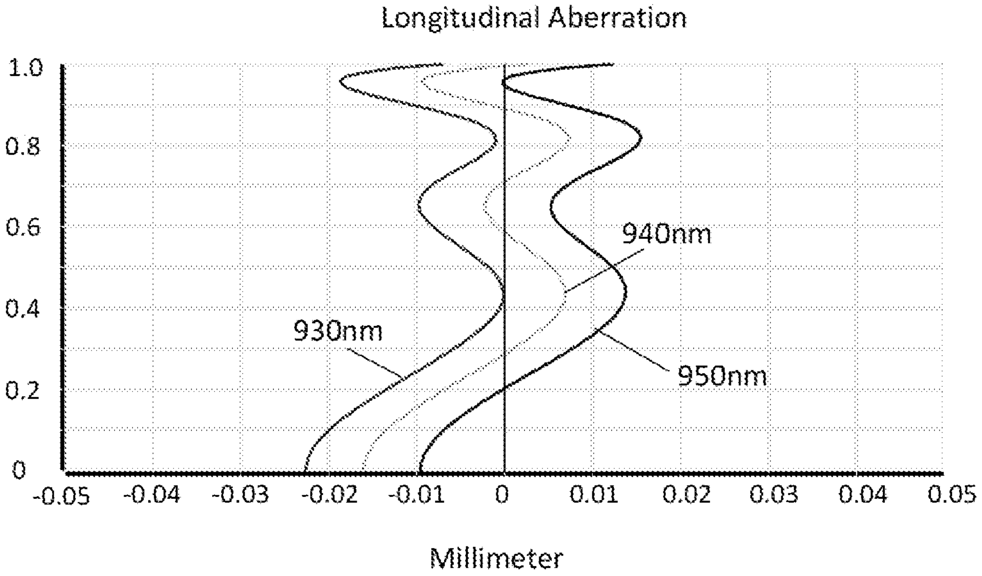
FIG. 20 is a schematic diagram of longitudinal aberration of the camera optical lens shown in FIG. 17.

FIG. 18 shows field curvature and distortion of light with a wavelength of 940 nm after passing through the camera optical lens 50. The field curvature S in FIG. 18 is the field curvature in a sagittal direction, and T is the field curvature in a meridional direction. FIG. 19 and FIG. 20 respectively show lateral color and longitudinal aberration of light with wavelengths 930 nm, 940 nm and 950 nm after passing through the camera optical lens 50.

As shown in Table 25, Embodiment 5 satisfies each relational expression.

In this embodiment, the entrance pupil diameter ENPD of the camera optical lens 50 is 7.397 mm, the full field of view image height IH in a diagonal direction is 9.615 mm, and the field of view FOV in the diagonal direction is 111.94°, so that the camera optical lens 50 meets the design requirements of large-aperture, wide-angle, ultra-thinness, lower-sensitivity and medium- to long-range distance imaging, its on-axis and off-axis chromatic aberrations are fully corrected, and has good optical characteristics.

COMPARATIVE EXAMPLE

Figure 21:
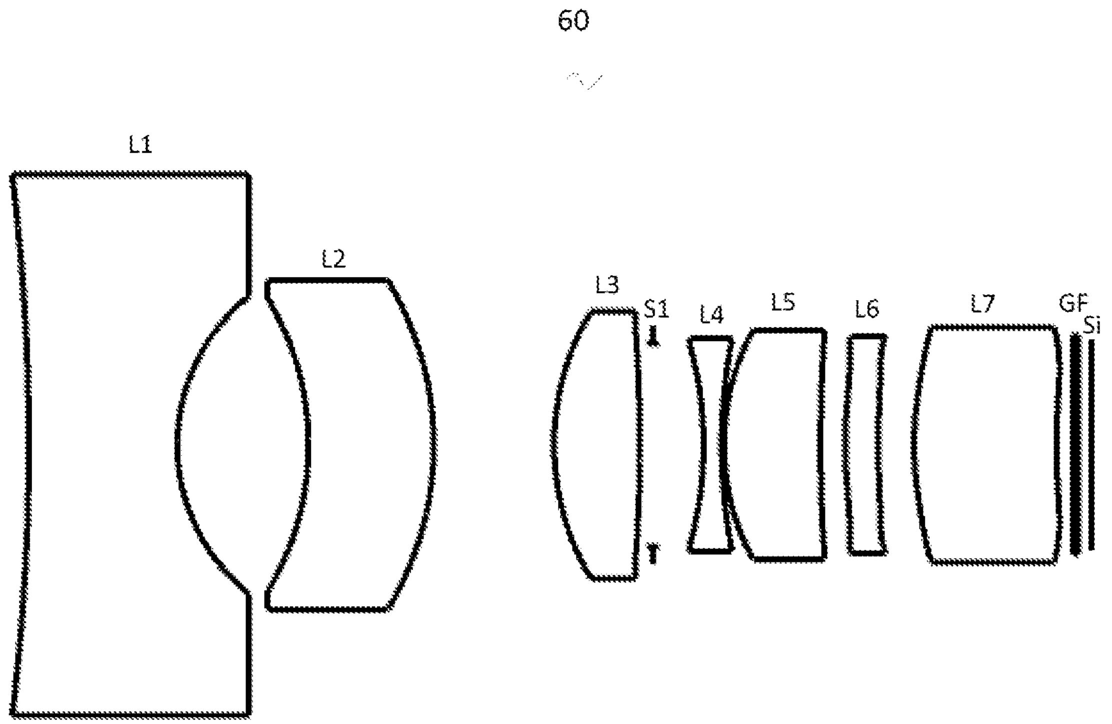
FIG. 21 is a structural schematic diagram of a camera optical lens according to a Comparative Example of the present disclosure.

FIG. 21 is a structural schematic diagram of a camera optical lens 60 in a Comparative Example, and the symbol meaning thereof is the same as that in Embodiment 1, so the same parts are not described herein again.

Table 21 shows design data of the camera optical lens 60 of the present disclosure.

TABLE 21

| | R | d | | nd | | vd | |
|---|---|---|---|---|---|---|---|
| S1 | ∞ | d0 = | −60.832 | | | | |
| R1 | −205.992 | d1 = | 13.403 | nd1 | 1.7130 | v1 | 53.87 |
| R2 | 17.592 | d2 = | 11.813 | | | | |
| R3 | −26.115 | d3 = | 11.283 | nd2 | 1.7400 | v2 | 28.29 |
| R4 | −29.362 | d4 = | 10.843 | | | | |
| R5 | 24.007 | d5 = | 7.734 | nd3 | 1.9037 | v3 | 31.32 |
| R6 | −143.404 | d6 = | 5.756 | | | | |
| R7 | −33.421 | d7 = | 1.607 | nd4 | 1.8467 | v4 | 23.83 |
| R8 | 49.986 | d8 = | 0.215 | | | | |
| R9 | 22.176 | d9 = | 8.693 | nd5 | 1.9108 | v5 | 35.26 |
| R10 | 142.457 | d10− | 2.241 | | | | |
| R11 | 36.165 | d11 = | 2.971 | nd6 | 1.8061 | v6 | 40.73 |
| R12 | 60.880 | d12 = | 3.230 | | | | |
| R13 | 28.546 | d13 = | 12.818 | nd7 | 1.8061 | v7 | 40.73 |
| R14 | 48.068 | d14 = | 1.481 | | | | |
| R15 | ∞ | d15 = | 0.500 | ndg | 1.4585 | vg | 67.82 |
| R16 | ∞ | d16 = | 1.200 | | | | |

Table 22 shows aspheric surface data of the sixth lens L6 and the seventh lens L7 in the camera optical lens 60 according to the Comparative Example of the present disclosure.

TABLE 22

| | Conic Coefficient | Aspherical Coefficient | | | | |
|---|---|---|---|---|---|---|
| | k | A4 | A6 | A8 | A10 | A12 |
| R11 | −6.9682E+01 | 1.6004E−05 | −2.4151E−06 | 4.4004E−08 | −6.5270E−10 | 9.2623E−12 |
| R12 | −1.1962E+02 | −8.8820E−05 | 8.6501E−07 | −1.3338E−08 | 4.5563E−10 | −7.6332E−12 |
| R13 | −4.8801E+01 | 1.5640E−04 | −4.9131E−06 | 1.1424E−07 | −1.9404E−09 | 2.3453E−11 |
| R14 | −7.2746E+01 | 7.5410E−06 | −1.9786E−06 | 4.5749E−08 | −1.1774E−09 | 1.9589E−11 |

| | Conic Coefficient | Aspherical Coefficient | | | |
|---|---|---|---|---|---|
| | k | A14 | A16 | A18 | A20 |
| R11 | −6.9682E+01 | −8.8925E−14 | 4.9648E−16 | −1.4363E−18 | 1.4951E−21 |
| R12 | −1.1962E+02 | 8.9709E−14 | −6.5167E−16 | 2.5764E−18 | −4.2128E−21 |
| R13 | −4.8801E+01 | −1.8769E−13 | 9.1784E−16 | −2.3786E−18 | 2.2742E−21 |
| R14 | −7.2746E+01 | −2.0084E−13 | 1.2905E−15 | −4.8392E−18 | 8.0905E−21 |

Table 23 and Table 24 show design data of inflection points and stationary points of each lens in the camera optical lens 60 according to the Comparative Example of the present disclosure.

TABLE 23

| | Number of inflection points | Inflection point position 1 | Inflection point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |
| P6R1 | 1 | 9.385 | / |
| P6R2 | 2 | 1.855 | 11.405 |
| P7R1 | 1 | 7.905 | / |
| P7R2 | 0 | / | / |

TABLE 24

| | Number of stationary points | Stationary point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |

TABLE 24-continued

| | Number of stationary points | Stationary point position 1 |
|---|---|---|
| P4R1 | 0 | / |
| P4R2 | 0 | / |
| P5R1 | 0 | / |
| P5R2 | 0 | / |
| P6R1 | 0 | / |
| P6R2 | 1 | 3.315 |
| P7R1 | 0 | / |
| P7R2 | 0 | / |

Figure 22:
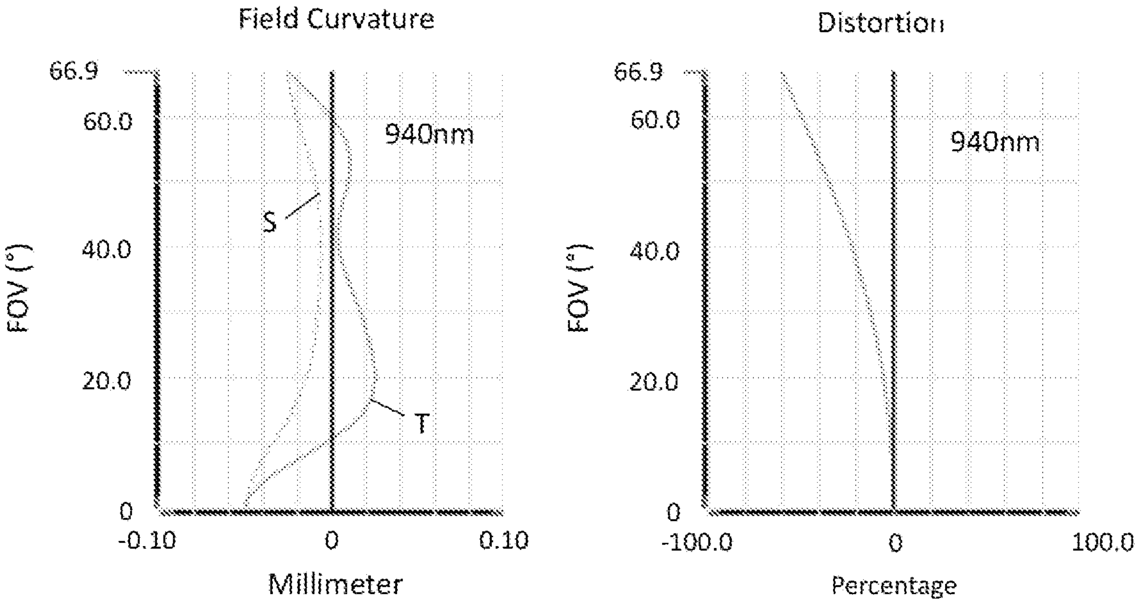
FIG. 22 is a schematic diagram of field curvature and distortion of the camera optical lens shown in FIG. 21.
Figure 23:
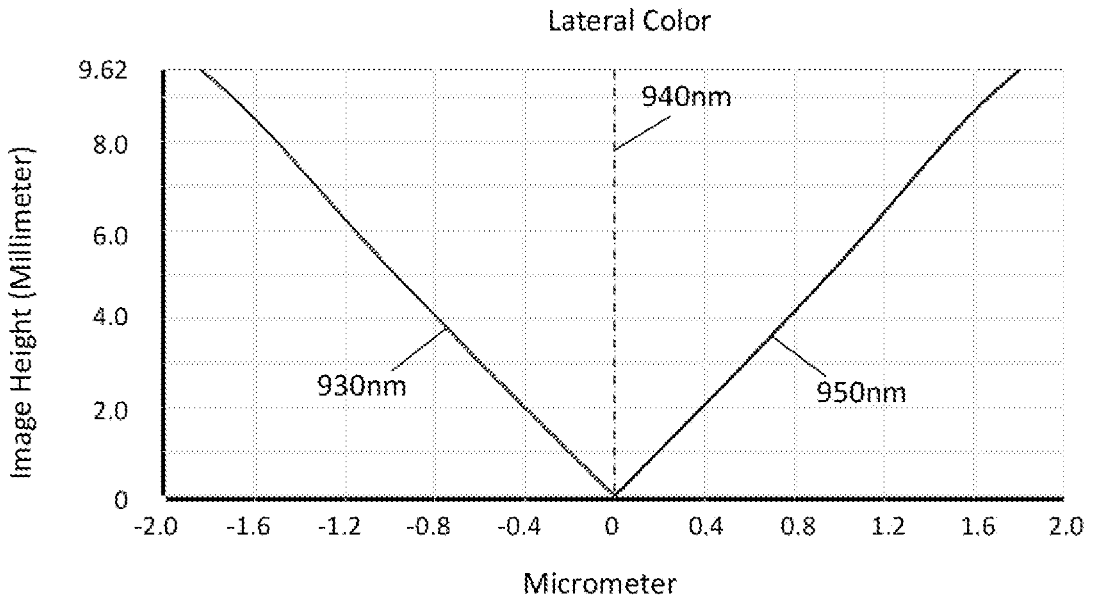
FIG. 23 is a schematic diagram of lateral color of the camera optical lens shown in FIG. 21.
Figure 24:
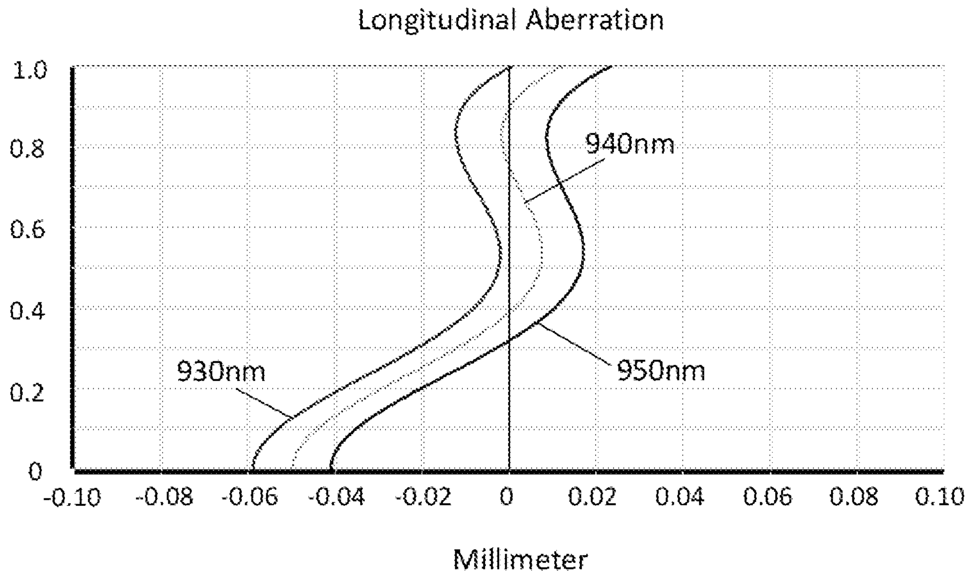
FIG. 24 is a schematic diagram of longitudinal aberration of the camera optical lens shown in FIG. 21.

FIG. 22 shows field curvature and distortion of light with a wavelength of 940 nm after passing through the camera optical lens 60. The field curvature S in FIG. 22 is the field curvature in a sagittal direction, and T is the field curvature in a meridional direction. FIG. 23 and FIG. 24 respectively show lateral color and longitudinal aberration of light with wavelengths 930 nm, 940 nm and 950 nm after passing through the camera optical lens 60.

In this comparative example, the entrance pupil diameter ENPD of the camera optical lens 60 is 7.9876 mm, the full field of view image height IH in a diagonal direction is 9.615 mm, and the field of view FOV in the diagonal direction is 133.76°.

Table 25 shows the values corresponding to the various values and parameters specified in the relational expressions in Embodiments 1-5 and the Comparative Example. Obviously, the camera optical lens 60 in the Comparative Example does not satisfy the above relational expression: $90.00 \leq (FOV \times f)/IH \leq 140.00$. The camera optical lens 60 cannot effectively consider a large field of view and a long focal length, cannot achieve medium- to long-range distance imaging, and has insufficient optical performance.

TABLE 25

| Parameters and Relational Expressions | Example 1 | Example 2 | Example 3 | Example 4 | Example 5 | Comparative Example |
|---|---|---|---|---|---|---|
| d6/TTL | 0.10 | 0.20 | 0.06 | 0.06 | 0.07 | 0.06 |
| (FOV × f)/IH | 114.85 | 108.37 | 139.85 | 91.58 | 111.95 | 144.46 |
| f3/f | 1.99 | 1.69 | 1.41 | 1.10 | 5.00 | 2.31 |
| R4/R3 | 3.03 | 1.58 | 1.01 | 15.00 | 4.95 | 1.12 |
| f | 10.869 | 14.709 | 15.799 | 9.938 | 9.616 | 10.384 |
| f1 | −20.873 | −31.247 | −22.343 | −23.530 | −43.124 | −22.605 |
| f2 | −54.054 | −111.487 | 298.090 | −129.466 | −107.908 | 730.783 |
| f3 | 21.613 | 24.867 | 22.203 | 10.950 | 48.078 | 23.947 |
| f4 | −41.322 | −101.587 | −24.982 | −26.081 | −21.093 | −24.330 |
| f5 | 26.955 | 25.524 | 31.435 | 19.678 | 34.891 | 28.632 |
| f6 | 181.086 | −291.595 | 79.825 | 486.197 | 25.743 | 107.444 |
| f7 | 50.416 | 1022.580 | 158.489 | 372.281 | 78.206 | 69.237 |

TABLE 25-continued

| Parameters and Relational Expressions | Example 1 | Example 2 | Example 3 | Example 4 | Example 5 | Comparative Example |
|---|---|---|---|---|---|---|
| f12 | −14.196 | −24.591 | −29.166 | −19.393 | −28.750 | −28.555 |
| FNO | 1.30 | 1.30 | 1.30 | 1.30 | 1.30 | 1.30 |

Among them, f12 is a combined focal length of the first lens L1 and the second lens L2.

Those skilled in the art can understand that the above embodiments are specific embodiments for implementing the present disclosure, and in practical applications, various changes may be made in form and detail without departing from the spirit and scope of the present disclosure.

What is claimed is:

1. A camera optical lens, comprising from an object side to an image side: a first lens having a negative refractive power, a second lens, a third lens having a positive refractive power, a fourth lens having a negative refractive power, a fifth lens having a positive refractive power, a sixth lens and a seventh lens having a positive refractive power;

wherein an on-axis distance from an image-side surface of the third lens to an object-side surface of the fourth lens is d6, a total optical length from an object-side surface of the first lens to an image plane of the camera optical lens along an optic axis of the camera optical lens is TTL, a field of view of the camera optical lens is FOV, a full field of view image height in a diagonal direction of the camera optical lens is IH, a focal length of the camera optical lens is f, a focal length of the third lens is f3, a central curvature radius of an object-side surface of the second lens is R3, a focal length of the fourth lens is f4, a focal length of the fifth lens is f5, and a central curvature radius of an image-side surface of the second lens is R4, and following relational expressions are satisfied:

$$0.06 \le d6/TTL \le 0.20;$$

$$90.00 \le (FOV \times f)/IH \le 140.00;$$

$$1.00 \le f3/f \le 5.00;$$

$$-4.00 \le f4/f5 \le -0.60, \text{ and}$$

$$1.00 \le R4/R3 \le 15.00.$$

2. The camera optical lens as described in claim 1, wherein a refractive index of the first lens is n1, and a following relational expression is satisfied:

$$1.70 \le n1 \le 2.10.$$

3. The camera optical lens as described in claim 1, wherein an on-axis thickness of the second lens is d3, an on-axis thickness of the third lens is d5, and a following relational expression is satisfied:

$$1.20 \le d3/d5 \le 5.00.$$

4. The camera optical lens as described in claim 1, wherein the first lens has a negative refractive power, and an image-side surface of the first lens is concave in a paraxial region;

a focal length of the first lens is f1, a central curvature radius of an object-side surface of the first lens is R1, a central curvature radius of an image-side surface of the first lens is R2, and an on-axis thickness of the first lens is d1, and following relational expressions are satisfied:

$$-4.50 \le f1/f \le -1.40;$$

$$0.24 \le (R1+R2)/(R1-R2) \le 2.57; \text{ and}$$

$$0.03 \le d1/TTL \le 0.20.$$

5. The camera optical lens as described in claim 1, wherein the object-side surface of the second lens is concave in a paraxial region, and the image-side surface of the second lens is convex in the paraxial region;

a focal length of the second lens is f2, an on-axis thickness of the second lens is d3, and following relational expressions are satisfied:

$$-13.03 \le f2/f \le 18.87; \text{ and}$$

$$0.09 \le d3/TTL \le 0.20.$$

6. The camera optical lens as described in claim 1, wherein the third lens has a positive refractive power, and an object-side surface of the third lens is convex in a paraxial region;

a central curvature radius of the object-side surface of the third lens is R5, a central curvature radius of the image-side surface of the third lens is R6, and an on-axis thickness of the third lens is d5, and following relational expressions are satisfied:

$$-2.06 \le (R5+R6)/(R5-R6) \le 0.30; \text{ and}$$

$$0.03 \le d5/TTL \le 0.09.$$

7. The camera optical lens as described in claim 1, wherein the fourth lens has a negative refractive power, and the object-side surface of the fourth lens is concave in a paraxial region;

a central curvature radius of the object-side surface of the fourth lens is R7, a central curvature radius of an image-side surface of the fourth lens is R8, an on-axis thickness of the fourth lens is d7, and following relational expressions are satisfied:

$$-6.91 \le f4/f \le -1.58;$$

$$-7.81 \le (R7+R8)/(R7-R8) \le -0.07; \text{ and}$$

$$0.01 \le d7/TTL \le 0.04.$$

8. The camera optical lens as described in claim 1, wherein the fifth lens has a positive refractive power, and an object-side surface of the fifth lens is convex in a paraxial region;

a central curvature radius of the object-side surface of the fifth lens is R9, a central curvature radius of an image-side surface of the fifth lens is R10, and an on-axis thickness of the fifth lens is d9, and following relational expressions are satisfied:

$$1.70 \le f5/f \le 3.63;$$

$$-2.38 \le (R9+R10)/(R9-R10) \le -0.34; \text{ and}$$

$$0.03 \le d9/TTL \le 0.15.$$

9. The camera optical lens as described in claim 1, wherein an object-side surface of the sixth lens is convex in a paraxial region, and an image-side surface of the sixth lens is concave in the paraxial region;

a focal length of the sixth lens is f6, a central curvature radius of the object-side surface of the sixth lens is R11, a central curvature radius of the image-side surface of the sixth lens is R12, and an on-axis thickness of the sixth lens is d11, and following relational expressions are satisfied:

$$-20.00 \le f6/f \le 49.00;$$

$$-70.00 \le (R11+R12)/(R11-R12) \le 11.35; \text{ and}$$

$$0.02 \le d11/TTL \le 0.07.$$

10. The camera optical lens as described in claim 1, wherein the seventh lens has a positive refractive power, an object-side surface of the seventh lens is convex in a paraxial region, and an image-side surface of the seventh lens is concave in the paraxial region;

a focal length of the seventh lens is f7, a central curvature radius of the object-side surface of the seventh lens is R13, a central curvature radius of the image-side surface of the seventh lens is R14, and an on-axis thickness of the seventh lens is d13, and following relational expressions are satisfied:

$$4.60 \le f7/f \le 70.00;$$

$$-17.00 \le (R13+R14)/(R13-R14) \le 39.00; \text{ and}$$

$$0.04 \le d13/TTL \le 0.25.$$

11. The camera optical lens as described in claim 1, wherein at least one of the first lens, the second lens, the third lens, the fourth lens, the fifth lens, the sixth lens, or the seventh lens is made of glass.

* * * * *